US012417726B2

(12) United States Patent
Pyo et al.

(10) Patent No.: US 12,417,726 B2
(45) Date of Patent: Sep. 16, 2025

(54) DISPLAY DEVICE

(71) Applicant: SAMSUNG DISPLAY CO., LTD., Yongin-si (KR)

(72) Inventors: Si Beak Pyo, Yongin-si (KR); Seung Kyu Lee, Yongin-si (KR); Choon Yul Oh, Yongin-si (KR); Jun Ho Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/829,244

(22) Filed: Sep. 9, 2024

(65) Prior Publication Data

US 2025/0006099 A1 Jan. 2, 2025

Related U.S. Application Data

(63) Continuation of application No. 18/491,499, filed on Oct. 20, 2023, now Pat. No. 12,087,203, which is a (Continued)

(30) Foreign Application Priority Data

Oct. 10, 2018 (KR) ........................ 10-2018-0120765

(51) Int. Cl.

| | |
|---|---|
| ***G09G 3/20*** | (2006.01) |
| ***G09G 3/32*** | (2016.01) |
| ***G09G 3/3233*** | (2016.01) |

(52) U.S. Cl.

CPC ......... *G09G 3/2007* (2013.01); *G09G 3/2003* (2013.01); *G09G 3/3233* (2013.01); (Continued)

(58) Field of Classification Search

CPC .. G09G 3/2007; G09G 3/2003; G09G 3/3233; G09G 2320/0686; (Continued)

(56) References Cited

U.S. PATENT DOCUMENTS 7,158,157 B2 1/2007 Yamazaki et al.
7,307,607 B2 12/2007 Osame et al.
(Continued)

FOREIGN PATENT DOCUMENTS

CN 1409404 A 4/2003
CN 1551707 A 12/2004
(Continued)

OTHER PUBLICATIONS

Chinese Office Action dated Dec. 15, 2023, issued in Chinese Patent Application No. 201910933265.X, 8 pages.
(Continued)

*Primary Examiner* — Andrew Sasinowski

(74) *Attorney, Agent, or Firm* — Womble Bond Dickinson (US) LLP

(57) ABSTRACT

A display device includes: a target pixel; observation target pixels located adjacent to the target pixel; and a grayscale corrector for converting an input grayscale value corresponding to the target pixel with reference to observation target grayscale values corresponding to the observation target pixels. The grayscale corrector includes: a light emitting pixel counter for providing a number of light emitting pixels by counting a number of observation target pixels that exceeds a reference value; and a grayscale converter for providing a converted grayscale value by converting the input grayscale value, based on the number of light emitting pixels.

20 Claims, 29 Drawing Sheets

Related U.S. Application Data continuation of application No. 17/717,977, filed on Apr. 11, 2022, now Pat. No. 11,798,454, which is a continuation of application No. 16/532,411, filed on Aug. 5, 2019, now Pat. No. 11,302,238.

(52) U.S. Cl.
CPC ....... *G09G 3/32* (2013.01); *G09G 2320/0276* (2013.01); *G09G 2320/0673* (2013.01); *G09G 2320/0686* (2013.01)

(58) Field of Classification Search
CPC ............. G09G 2320/0673; G09G 3/32; G09G 2320/0276; G09G 2320/0233; G09G 2360/16; G09G 2300/0443; G09G 2300/0452; G09G 2320/0666
See application file for complete search history.

(56) References Cited

U.S. PATENT DOCUMENTS

| | | | | |
|---|---|---|---|---|
| 7,379,081 | B2 | 5/2008 | Park et al. | |
| 7,705,810 | B2 | 4/2010 | Choi et al. | |
| 7,864,192 | B2 | 1/2011 | Kim et al. | |
| 7,999,768 | B2 | 8/2011 | Kim et al. | |
| 8,194,010 | B2 | 6/2012 | Lee | |
| 8,456,483 | B2 | 6/2013 | Han | |
| 9,208,718 | B2 | 12/2015 | Pyo | |
| 9,928,782 | B2 | 3/2018 | Do et al. | |
| 9,984,614 | B2 | 5/2018 | Hwang | |
| 10,140,935 | B2 | 11/2018 | Son et al. | |
| 10,283,086 | B1 | 5/2019 | Su et al. | |
| 10,360,868 | B2 | 7/2019 | Liu | |
| 10,490,161 | B2 | 11/2019 | Lin et al. | |
| 2002/0070948 | A1 | 6/2002 | Murai et al. | |
| 2004/0222999 | A1 | 11/2004 | Choi et al. | |
| 2007/0176862 | A1 | 8/2007 | Kurt et al. | |
| 2007/0252782 | A1 | 11/2007 | Yui | |
| 2008/0211747 | A1 | 9/2008 | Kim | |
| 2009/0009779 | A1 | 1/2009 | Do | |
| 2009/0251443 | A1 | 10/2009 | Jinta | |
| 2010/0259556 | A1 | 10/2010 | Inuzuka | |
| 2011/0109655 | A1 | 5/2011 | Takeda | |
| 2012/0242680 | A1 | 9/2012 | Park | |
| 2013/0076803 | A1 | 3/2013 | Lee et al. | |
| 2013/0249955 | A1 | 9/2013 | Kim et al. | |
| 2014/0002864 | A1 | 1/2014 | Li et al. | |
| 2014/0097760 | A1 | 4/2014 | Kato et al. | |
| 2014/0139565 | A1 | 5/2014 | Choi | |
| 2014/0184654 | A1 | 7/2014 | Lee | |
| 2014/0375699 | A1 | 12/2014 | Park et al. | |
| 2015/0015465 | A1 | 1/2015 | Gong | |
| 2015/0070403 | A1 | 3/2015 | Kim et al. | |
| 2016/0049112 | A1 | 2/2016 | Jung et al. | |
| 2016/0189676 | A1 | 6/2016 | Pyo | |
| 2016/0196781 | A1 | 7/2016 | Tanaka et al. | |
| 2016/0267838 | A1* | 9/2016 | Zhang .................. | G09G 3/3225 |
| 2016/0365024 | A1 | 12/2016 | Pyo | |
| 2017/0011682 | A1 | 1/2017 | Pyo et al. | |
| 2017/0069273 | A1 | 3/2017 | Park | |
| 2017/0116961 | A1 | 4/2017 | Jun et al. | |
| 2017/0243548 | A1* | 8/2017 | Wang ....................... | G09G 3/20 |
| 2017/0287988 | A1 | 10/2017 | Lee et al. | |
| 2018/0061355 | A1 | 3/2018 | Zheng et al. | |
| 2018/0096669 | A1 | 4/2018 | Koizumi | |
| 2018/0174527 | A1 | 6/2018 | Botzas et al. | |
| 2018/0366052 | A1 | 12/2018 | Shi | |
| 2019/0130827 | A1 | 5/2019 | Pyo et al. | |
| 2019/0266941 | A1 | 8/2019 | Pyo et al. | |
| 2019/0304372 | A1 | 10/2019 | Pyo et al. | |
| 2019/0340981 | A1 | 11/2019 | Pyo | |
| 2020/0175924 | A1 | 6/2020 | Bang et al. | |
| 2022/0238079 | A1 | 7/2022 | Yu et al. | |

FOREIGN PATENT DOCUMENTS

| | | | |
|---|---|---|---|
| CN | 1848218 | A | 10/2006 |
| CN | 1934606 | A | 3/2007 |
| CN | 101097684 | A | 1/2008 |
| CN | 101217021 | A | 7/2008 |
| CN | 101266773 | A | 9/2008 |
| CN | 104349098 | A | 2/2015 |
| CN | 105304029 | A | 2/2016 |
| CN | 105741799 | A | 7/2016 |
| CN | 106097958 | A | 11/2016 |
| CN | 106340267 | A | 1/2017 |
| JP | 2004-46124 | A | 2/2004 |
| JP | 2007-112016 | A | 5/2007 |
| JP | 2007-199683 | A | 8/2007 |
| JP | 2010-263345 | A | 11/2010 |
| JP | 2011-156214 | A | 8/2011 |
| KR | 10-2004-0096273 | A | 11/2004 |
| KR | 10-2007-0003937 | A | 1/2007 |
| KR | 10-2008-0033651 | A | 4/2008 |
| KR | 10-2013-0032759 | A | 4/2013 |
| KR | 10-2017-0037710 | A | 4/2017 |
| KR | 10-2017-0047444 | A | 5/2017 |
| KR | 10-2019-0049977 | A | 5/2019 |
| KR | 10-2019-0104086 | A | 9/2019 |
| KR | 10-2019-0128017 | A | 11/2019 |
| TW | 200421244 | A | 10/2004 |

OTHER PUBLICATIONS

Chinese Office Action for CN Application No. 202010110729.X dated Mar. 26, 2024, 19 pages.
Extended European Search Report for corresponding European Application No. 19202450.3, dated Mar. 5, 2020, 14 pages.
Korean Notice of Allowance dated Jan. 30, 2024, issued in Korean Patent Application No. 10-2019-0024131, 6 pages.
U.S. Office Action dated Feb. 12, 2021, issued in U.S. Appl. No. 16/732,744 (14 pages).
U.S. Office Action dated Jul. 14, 2021, issued in U.S. Appl. No. 16/732,744 (8 pages).
U.S. Notice of Allowance dated Nov. 12, 2021, issued in U.S. Appl. No. 16/732,744 (10 pages).
US Office Action dated Sep. 15, 2022, issued in U.S. Appl. No. 17/699,651 (18 pages).

* cited by examiner

DISPLAY DEVICE

CROSS-REFERENCE TO RELATED APPLICATIONS

This application is a continuation of U.S. patent application Ser. No. 18/491,499, filed Oct. 20, 2023, which is a continuation of U.S. patent application Ser. No. 17/717,977, filed Apr. 11, 2022, now U.S. Pat. No. 11,798,454, which is a continuation of U.S. patent application Ser. No. 16/532,411, filed Aug. 5, 2019, now U.S. Pat. No. 11,302,238, which claims priority to and the benefit of Korean Patent Application No. 10-2018-0120765, filed Oct. 10, 2018, the entire content of all of which is incorporated herein by reference.

BACKGROUND

1. Field

The present disclosure generally relates to a display device.

2. Description of the Related Art

With the development of information technologies, the importance of a display device, which is a connection medium between a user and information, increases. Accordingly, display devices such as liquid crystal display devices and organic light emitting display devices are increasingly used.

An organic light emitting display device includes a plurality of pixels, and displays an image frame by allowing organic light emitting diodes of the plurality of pixels to emit lights so as to correspond to a plurality of grayscale values constituting the image frame.

In general, in the organic light emitting display device, grayscale voltages are set to exhibit a luminance according to a gamma curve more suitable for a white color light radiated when pixels of different colors emit lights with the same grayscale value.

Therefore, when a mixed color light or a single color light is radiated instead of the white color light, using the set grayscale voltages, the luminance of the mixed color light or the single color light does not exactly correspond to the above-described gamma curve. In addition, there exists a lateral leakage problem in that, when the single color light is radiated, holes of driving current flowing in a corresponding pixel are leaked to an adjacent pixel having a small resistance through a P-doped Hole Injection Layer (PHIL) that is a layer shared by the organic light emitting diodes, and therefore, the corresponding pixel does not emit light with a desired luminance.

SUMMARY

Embodiments provide a display device capable of exhibiting a desired luminance not only when a white color light is radiated but also when a single color light or a mixed color light is radiated.

According to an aspect of the present disclosure, there is provided a display device including: a target pixel; observation target pixels located adjacent to the target pixel; and a grayscale corrector configured to convert an input grayscale value corresponding to the target pixel with reference to observation target grayscale values corresponding to the observation target pixels, wherein the grayscale corrector includes: a light emitting pixel counter configured to provide a number of light emitting pixels by counting a number of observation target grayscale values that exceed a reference value; and a grayscale converter configured to provide a converted grayscale value by converting the input grayscale value, based on the number of light emitting pixels.

The grayscale corrector may further include a single color offset provider configured to provide single color offset values. When the number of light emitting pixels is 0, the grayscale converter may generate the converted grayscale value by adding a corresponding offset value from among the single color offset values to the input grayscale value.

The grayscale corrector may further include a mixed color offset provider configured to provide mixed color offset values. When the number of light emitting pixels is greater than 0 and is less than the number of observation target pixels, the grayscale converter may generate the converted grayscale value by adding a corresponding offset value from among the mixed color offset values to the input grayscale value.

When the number of light emitting pixels is equal to the number of observation target pixels, the grayscale converter may determine the input grayscale value as the converted grayscale value.

The single color offset provider may include: a reference offset provider configured to receive an input maximum luminance value, and to provide reference offset values corresponding to the input maximum luminance value; and a total offset generator configured to generate single color offset values by interpolating the reference offset values.

The reference offset provider may include a preset determiner configured to store, in advance, preset offset values corresponding to preset maximum luminance values, and to determine whether the input maximum luminance value corresponds to any one of the preset maximum luminance values. When the input maximum luminance value corresponds to any one of the preset maximum luminance values, the preset determiner may provide the corresponding preset offset values as the reference offset values.

When the input maximum luminance value does not correspond to any one of the preset maximum luminance values, the preset determiner may provide the preset offset values corresponding to at least two preset maximum luminance values. The reference offset provider may further include a reference offset generator configured to generate the reference offset values by interpolating the preset offset values corresponding to the at least two preset maximum luminance values.

The preset maximum luminance values may include a maximum value and a minimum value of a receivable input maximum luminance value.

The preset maximum luminance values may further include a first intermediate maximum luminance value. When the input maximum luminance value is between the maximum value and the first intermediate maximum luminance value, a grayscale voltage corresponding to the converted grayscale value may be adjusted corresponding to the input maximum luminance value, so that the luminance of the target pixel is controlled.

When the input maximum luminance value is between the minimum value and the first intermediate maximum luminance value, an emission period of the target pixel may be adjusted corresponding to the input maximum luminance value, so that the luminance of the target pixel is controlled.

The preset maximum luminance values may further include a second intermediate maximum luminance value that is between the first intermediate maximum luminance value and the minimum value.

The target pixel may be a pixel that emits light of a first color with a luminance corresponding to the converted grayscale value, and at least some of the observation target pixels may be pixels that emit light of a second color different from the first color.

At least some of the observation target pixels may be pixels that emit light of a third color different from the first color and the second color.

The grayscale corrector may further include a single color offset provider configured to provide single color offset values. When the number of light emitting pixels is 0, the grayscale converter may generate the converted grayscale value by adding a corresponding offset value from among the single color offset values to the input grayscale value.

The grayscale corrector may further include a mixed color offset provider configured to provide mixed color offset values. When the number of light emitting pixels is greater than 0 and is less than the number of observation target pixels, the grayscale converter may generate the converted grayscale value by adding a corresponding offset value from among the mixed color offset values to the input grayscale value.

When the number of light emitting pixels is equal to the number of observation target pixels, the grayscale converter may determine the input grayscale value as the converted grayscale value.

At least some of the observation target pixels may be pixels that emit light of the first color.

The grayscale corrector may further include a single color offset provider configured to provide single color offset values. When the number of light emitting pixels corresponding to the second color and the third color is 0, the grayscale converter may generate the converted grayscale value by adding a corresponding offset value from among the single color offset values to the input grayscale value.

The grayscale corrector may further include a mixed color offset provider configured to provide mixed color offset values. When the number of light emitting pixels corresponding to the second color and the third color is not 0 and is less than the number of observation target pixels corresponding to the second color and the third color, the grayscale converter may generate the converted grayscale value by adding a corresponding offset value from among the mixed color offset values to the input grayscale value.

When the number of light emitting pixels corresponding to the second color and the third color is equal to the number of observation target pixels corresponding to the second color and the third color, the grayscale converter may determine the input grayscale value as the converted grayscale value.

According to another aspect of the present disclosure, there is provided a display device including: a first pixel configured to emit light of a first color; a second pixel configured to emit light of a second color different from the first color; a third pixel configured to emit light of a third color different from the first color and the second color; and a grayscale corrector configured to convert input grayscale values corresponding to the first, second, and third pixels to converted grayscale values, wherein the first, second, and third pixels are configured to emit lights, based on the converted grayscale values, wherein a first luminance of the first pixel in a first case where the first pixel, the second pixel, and the third pixel emit lights is different from a second luminance of the first pixel in a second case where only the first pixel emits light and the second and third pixels do not emit light, wherein an input grayscale value corresponding to the first pixel in the first case is equal to that corresponding to the first pixel in the second case, and a converted grayscale value corresponding to the first luminance is different from that corresponding to the second luminance.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it may be the only element between the two elements, or one or more intervening elements may also be present. Like reference numerals refer to like elements throughout.

DETAILED DESCRIPTION

Figure 1:
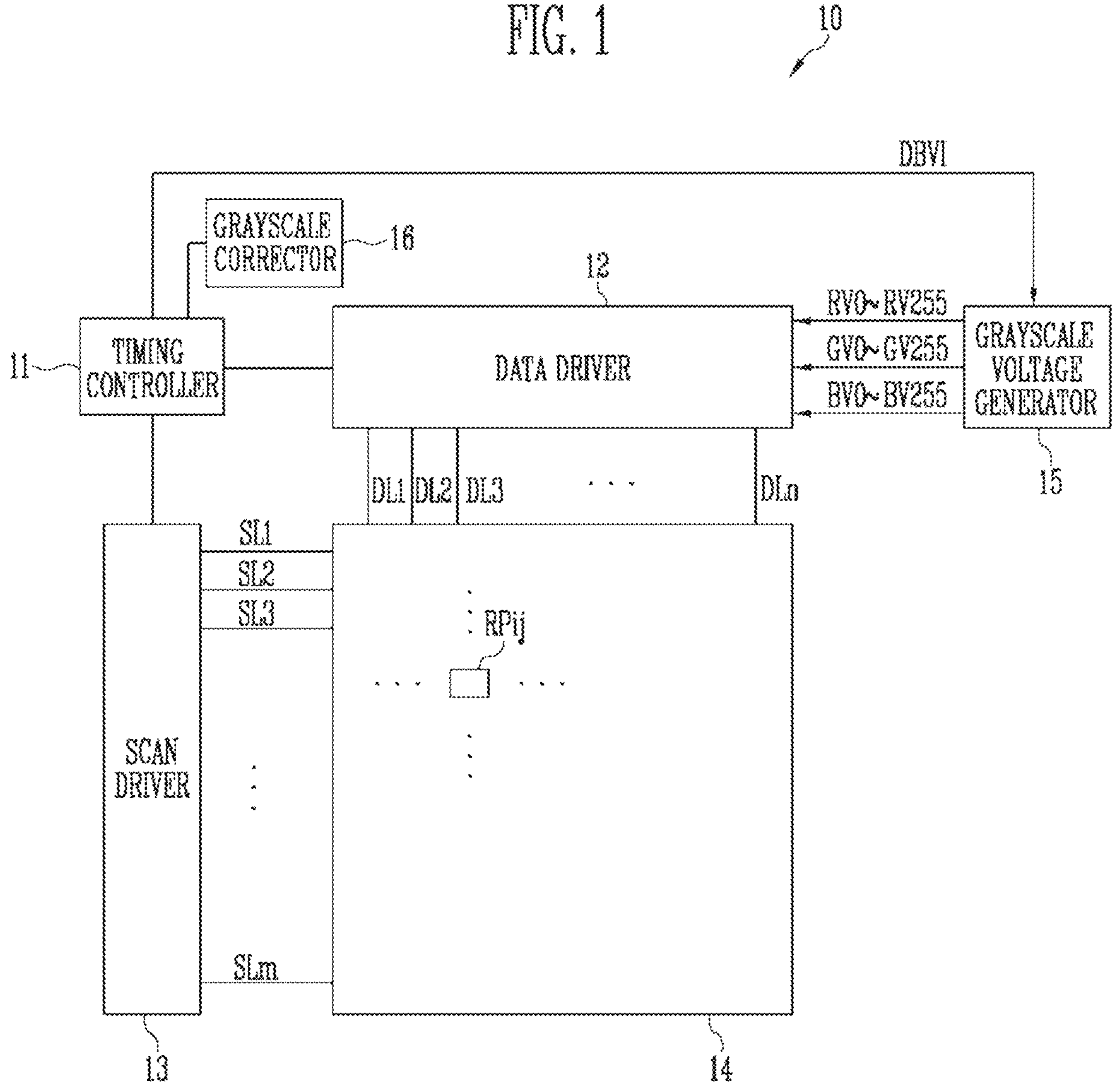
FIG. 1 is a diagram illustrating a display device according to an embodiment of the present disclosure.

Hereinafter, exemplary embodiments are described in detail with reference to the accompanying drawings so that those skilled in the art may practice the present disclosure.

The present disclosure may be implemented in various different forms and is not limited to the exemplary embodiments described in the present specification.

A part irrelevant to the description may be omitted to clearly describe the present disclosure, and the same or similar constituent elements may be designated by the same reference numerals throughout the specification. Therefore, the same reference numerals may be used in different drawings to identify the same or similar elements.

In addition, the size and thickness of each component illustrated in the drawings may be arbitrarily shown for better understanding and ease of description, but the present disclosure is not limited thereto. Thicknesses of several portions and regions may have been exaggerated for clear expressions.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

The electronic or electric devices and/or any other relevant devices or components according to embodiments of the present disclosure described herein, such as, for example, an external controller, a timing controller, a data driver, a scan driver, a grayscale voltage generator, a grayscale corrector, and an emission driver, may be implemented utilizing any suitable hardware, firmware (e.g. an application-specific integrated circuit), software, or a combination of software, firmware, and hardware known to those of ordinary skill in the art. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of ordinary skill in the art should recognize that the functionality of various computing/electronic devices may be combined or integrated into a single computing/electronic device, or the functionality of a particular computing/electronic device may be distributed across one or more other computing/electronic devices without departing from the spirit and scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a diagram illustrating a display device according to an embodiment of the present disclosure.

Referring to FIG. 1, the display device 10 according to the embodiment of the present disclosure may include a timing controller 11, a data driver 12, a scan driver 13, pixels 14 in a display region, a grayscale voltage generator 15, and a grayscale corrector 16.

The timing controller 11 may receive input grayscale values with respect to an image frame and control signals, which are provided from an external controller. The grayscale corrector 16 may provide converted grayscale values by correcting the input grayscale values.

The timing controller 11 may provide the data driver 12 with the converted grayscale values and the control signals. Also, the timing controller 11 may provide the scan driver 13 with a clock signal, a scan start signal, and the like.

The data driver 12 may generate data voltages to be provided to data lines DL1, DL2, DL3, . . . , and DLn, using the converted grayscale values and the control signals, which are received from the timing controller 11. For example, the data driver 12 may sample converted grayscale values, using the clock signal, and apply data voltages corresponding to the converted grayscale values to the data lines DL1 to DLn in units of pixel rows. Here, n may be a natural number. The data voltages may correspond to grayscale voltages RV0 to RV255, GV0 to GV255, and BV0 to BV255 provided from the grayscale voltage generator 15.

The scan driver 13 may generate scan signals to be provided to scan lines SL1, SL2, SL3, . . . , and SLm by receiving the clock signal, the scan start signal, and the like from the timing controller 11. For example, the scan driver 13 may sequentially provide the scan signals having a turn-on level pulse to the scan line SL1 to SLm. For example, the scan driver 13 may be configured in the form of a shift register, and generate the scan signals in a manner that sequentially transfers the scan start signal provided in the form of a turn-on level pulse to a next stage circuit under the control of the clock signal. Here, m may be a natural number.

The pixels 14 may include pixels RPij. Each pixel RPij may be connected to a corresponding scan line and a corresponding data line. Here, i and j may be natural numbers. The pixel RPij may refer to a pixel in which a scan transistor is connected to an ith scan line and a jth data line.

The pixels 14 may include pixels for emitting light of a first color, pixels for emitting light of a second color, and pixels for emitting light of a third color. The first color, the second color, and the third color may be colors different from one another. For example, the first color may be one color from among red, green, and blue, the second color may be one color except the first color from among red, green, and blue, and the third color may be the other color except the first color and the second color from among red, green, and blue. In addition, magenta, cyan, and yellow instead of red, green, and blue may be used as the first to third colors. However, for convenience of description, a case where red, green, and blue are used as the first to third colors, and magenta, cyan, and yellow are respectively expressed as a combination of red and blue, a combination of green and blue, and a combination of red and green is described in this embodiment.

Hereinafter, a case where the pixels 14 are arranged in a diamond Pentile® form is assumed and described. Pentile® is a registered trademark of Samsung Display Co., Ltd., Yongin-si, Republic of Korea. However, even if the pixels 14 were arranged in another suitable arrangement form, e.g., a form such as an RGB-stripe, an S-stripe, a read RGB, or a normal Pentile®, those skilled in the art after reviewing the present disclosure would know how to appropriately set a target pixel and observation target pixels, which will be described later, so as to implement embodiments of the present disclosure.

Hereinafter, the positions of the pixels 14 may be described based on the position of a light emitting diode of each of the pixels 14. That is, the position of a pixel circuit connected to the light emitting diode of each of the pixels 14 may not correspond to the position of the light emitting diode, and the pixel circuit may be appropriately disposed in the display device 10.

The grayscale voltage generator 15 may receive an input maximum luminance value DBVI from the timing controller 11, and provide grayscale voltages RV0 to RV255 of the pixels of the first color, which correspond to the input maximum luminance value DBVI, grayscale voltages GV0 to GV255 of the pixels of the second color, which correspond to the input maximum luminance value DBVI, and grayscale voltages BV0 to BV255 of the pixels of the third color, which correspond to the input maximum luminance value DBVI. Hereinafter, a case where a total of 256 grayscale levels (i.e., gray levels) from grayscale level 0 (minimum grayscale level) to grayscale level 255 (maximum grayscale level) exist will be described for convenience of description. However, when a grayscale value is expressed exceeding 8 bits, a greater number of grayscale levels may exist. The minimum grayscale level may be the darkest grayscale level, and the maximum grayscale level may be the brightest grayscale level.

A maximum luminance value may be a luminance value of lights emitted from pixels, corresponding to the maximum grayscale level. For example, the maximum luminance value may be a luminance value of a white color light generated when a pixel of the first color, which constitutes one dot, emits light corresponding to the grayscale level 255, a pixel of the second color, which constitutes one dot, emits light corresponding to the grayscale level 255, and a pixel of the third color, which constitutes one dot, emits light corresponding to the grayscale level 255. The unit of a luminance value may be a nit.

Therefore, the pixels may display a partially (spatially) dark or bright image frame, but the maximum brightness of the image frame is limited to the maximum luminance value. The maximum luminance value may be manually set by a manipulation of a user with respect to the display device 10, or be automatically set by an algorithm linked with an illumination sensor, etc. The set maximum luminance value is expressed as an input maximum luminance value.

The maximum luminance value may be changed depending on products. However, for example, the maximum value of the maximum luminance value may be 1200 nit, and the minimum value of the maximum luminance value may be 4 nits. When the input maximum luminance DBVI is changed even though grayscale values are the same, the grayscale corrector 16 provides different grayscale voltages RV0 to RV255, GV0 to GV255, and BV0 to BV255, and therefore, the light emitting luminance of a pixel is changed.

The grayscale corrector 16 may correct an input grayscale value to a converted grayscale value as described above. The grayscale corrector 16 will be described in detail later with reference to drawings from FIG. 15.

In the above-described embodiment, a case where the grayscale corrector 16 is a component separate from the timing controller 11 is illustrated. In some embodiments, a portion or the whole of the grayscale corrector 16 may be integrally configured with the timing controller 11. For example, a portion or the whole of the grayscale corrector 16 along with the timing controller 11 may be configured in the form of an integrated circuit. In some embodiments, a portion or the whole of the grayscale corrector 16 may be implemented in a software manner in the timing controller 11.

In another embodiment, a portion or the whole of the grayscale corrector 16 along with the data driver 12 may be configured in the form of an integrated circuit. In some embodiments, a portion or the whole of the grayscale corrector 16 may be implemented in a software manner in the timing controller 11. In an embodiment, the timing controller 11 may first provide input grayscale values to the data driver 12, and the grayscale corrector 16 or the data driver 12 may autonomously correct the input grayscale values to converted grayscale values.

In still another embodiment, a portion or the whole of the grayscale corrector 16 along with the external controller may be configured in the form of an integrated circuit. In some embodiments, a portion or the whole of the grayscale corrector 16 may be implemented in a software manner in the external controller. In an embodiment, the timing controller 11 may directly receive converted grayscale values provided from the external controller.

Figure 2:
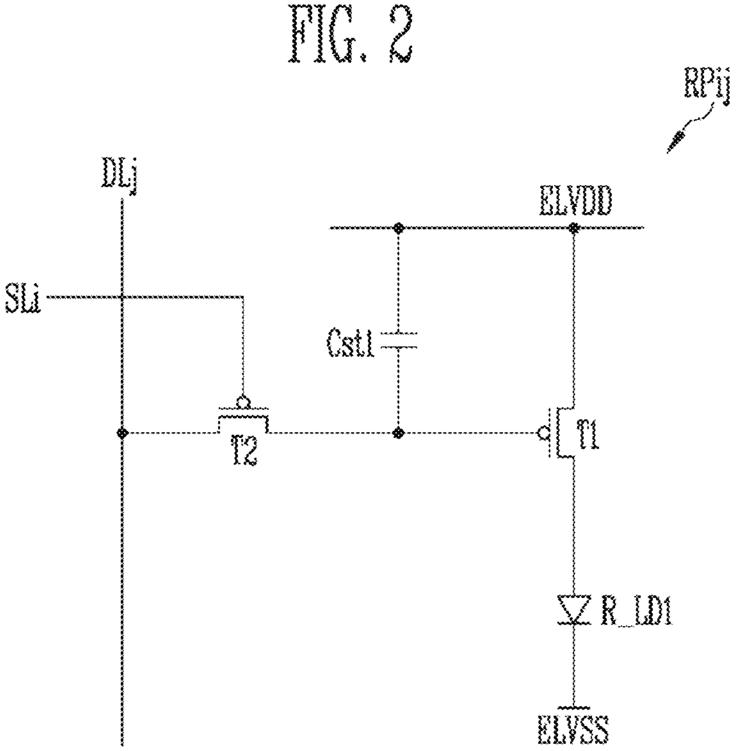
FIG. 2 is a diagram illustrating an exemplary pixel of the display device of FIG. 1.
Figure 3:
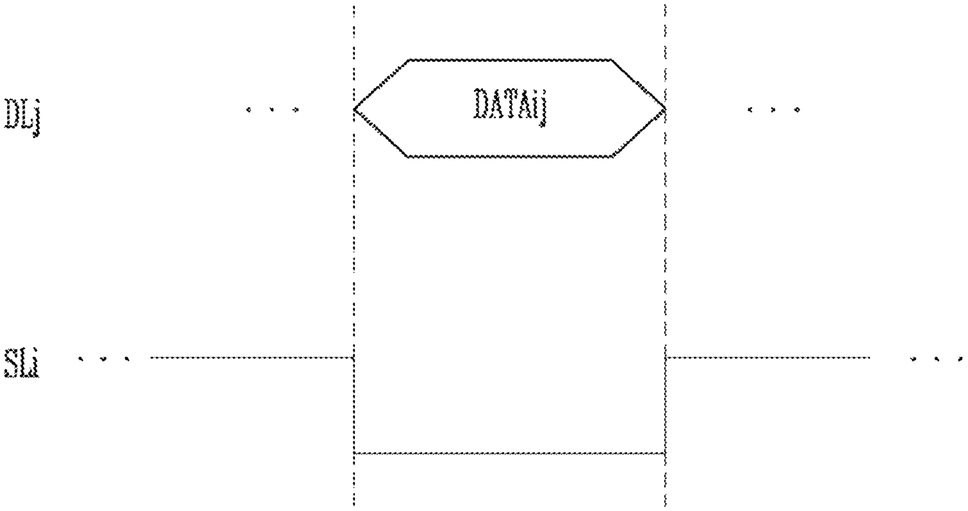
FIG. 3 is a diagram illustrating an exemplary driving method of the pixel of FIG. 2.

FIG. 2 is a diagram illustrating an exemplary pixel of the display device of FIG. 1. FIG. 3 is a diagram illustrating an exemplary driving method of the pixel of FIG. 2.

The pixel RPij may be a pixel for emitting light of the first color. Pixels for emitting light of the second color or the third color include components that are substantially identical to those of the pixel RPij, except for a light emitting diode R_LD1, and therefore, overlapping descriptions may be omitted.

The pixel RPij may include a plurality of transistors T1 and T2, a storage capacitor Cst1, and the light emitting diode R_LD1. While the pixel RPij (or other pixels such as the pixel RPij' of FIG. 4) having a single light emitting diode R_LD1 (or R_LD2) is primarily being referred to herein as a pixel, the pixel RPij may alternately be referred to as a subpixel of a pixel including a plurality of subpixels. In such a pixel including a plurality of subpixels, each of the subpixels may be configured to emit light of a color, such as, for example, red, green, blue, or white. Further, such a pixel may include two or more subpixels that are configured to emit a same color while including only one subpixel per each of other colors.

In this embodiment, a case where the transistors are implemented with P-type transistors, e.g., a PMOS transistors, is illustrated, but those skilled in the art would know how to implement a pixel circuit having the same function, using N-type transistors, e.g., NMOS transistors, based on the teachings of the present disclosure.

A gate electrode of the transistor T2 is connected to a scan line SLi, one electrode of the transistor T2 is connected to a data line DLj, and the other electrode of the transistor T2 is connected to a gate electrode of the transistor T1. The transistor T2 may be referred to as a switching transistor, a scan transistor or the like.

The gate electrode of the transistor T1 is connected to the other electrode of the transistor T2, one electrode of the transistor T1 is connected to a first power voltage line ELVDD, and the other electrode of the transistor T1 is connected to an anode of the light emitting diode R_LD1. The transistor T1 may be referred to as a driving transistor.

The storage capacitor Cst1 is interposed between the one electrode and the gate electrode of the transistor T1, and is configured to apply voltage between the one electrode and the gate electrode of the transistor T1.

The anode of the light emitting diode R_LD1 is connected to the other electrode of the transistor T1, and a cathode of the light emitting diode R_LD1 may be connected to a second power voltage line ELVSS. The light emitting diode R_LD1 may be an element (or a device) that emits light having a wavelength corresponding to the first color. The light emitting diode R_LD1 may correspond to an organic light emitting diode, a nano light emitting diode, etc.

When a turn-on level (low level) scan signal is supplied (i.e., applied) to the gate electrode of the transistor T2 through the scan line SLi, the transistor T2 connects (e.g., electrically connects) the data line DLj and one electrode of the storage capacitor Cst1. Therefore, a voltage value corresponding to the difference between a data voltage DATAij applied to the data line DLj and a voltage of the first power voltage line ELVDD is written in the storage capacitor Cst1. The data voltage DATAij may correspond (or may substantially correspond) to one of the grayscale voltages RV0 to RV255.

The transistor T1 allows a driving current determined according to the voltage value written in the storage capacitor Cst1 to flow from the first power voltage line ELVDD to the second power voltage line ELVSS. The light emitting diode R_LD1 emits light with a luminance corresponding to a magnitude of the driving current.

Figure 4:
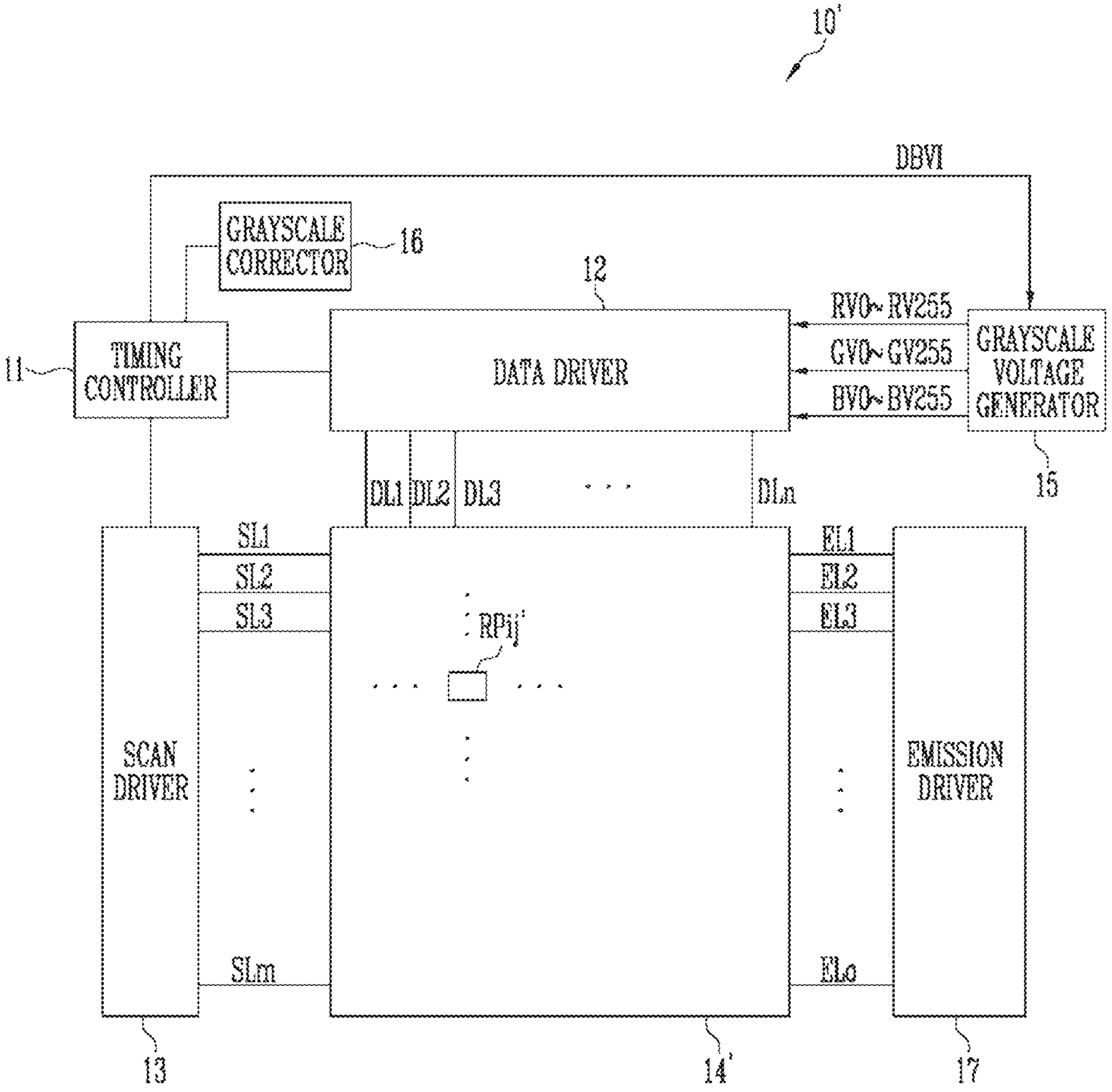
FIG. 4 is a diagram illustrating a display device according to another embodiment of the present disclosure.

FIG. 4 is a diagram illustrating a display device according to another embodiment of the present disclosure.

The display device 10' of FIG. 4 may include components substantially identical to those of the display device 10 of FIG. 1, except for an emission driver 17 and pixels 14' in a display region. Therefore, descriptions of overlapping components may be omitted.

The emission driver 17 may receive a clock signal, an emission stop signal, etc., and may generate emission signals to be provided to emission lines EL1, EL2, EL3, . . . , and ELo. For example, the emission driver 17 may sequentially provide the emission signals having a turn-off level pulse to the emission lines EL1 to ELo. For example, the emission driver 17 may be configured in the form of a shift register, and may generate the emission signals in a manner that sequentially transfers the emission stop signal provided in the form of a turn-off level pulse to a next stage circuit under the control of the clock signal. Here, o may be a natural number.

The pixels 14' may include pixels RPij'. Each pixel RPij' may be connected to a corresponding data line, a corresponding scan line, and a corresponding emission line.

Figure 5:
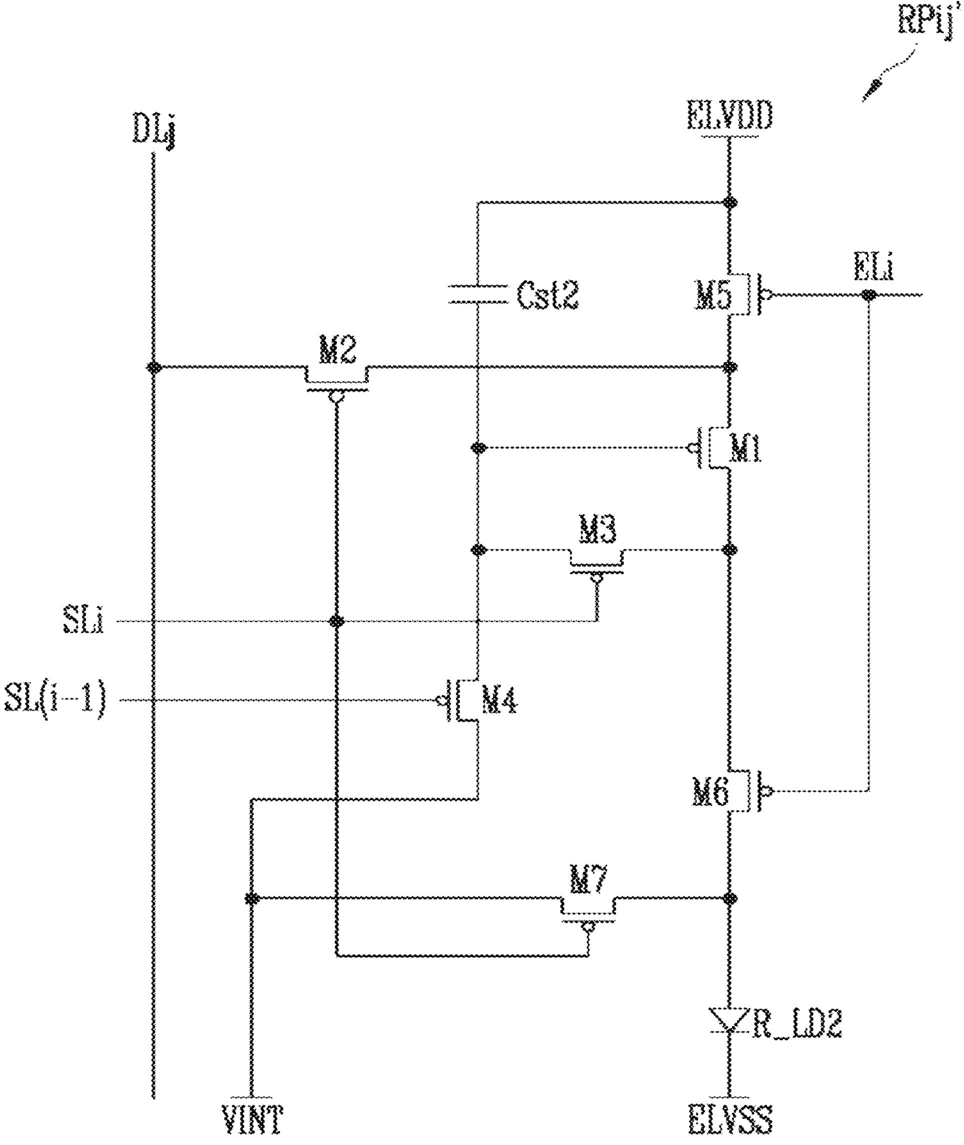
FIG. 5 is a diagram illustrating an exemplary pixel of the display device of FIG. 4.

FIG. 5 is a diagram illustrating an exemplary pixel of the display device of FIG. 4.

Referring to FIG. 5, the pixel RPij' may include transistors M1, M2, M3, M4, M5, M6, and M7, a storage capacitor Cst2, and a light emitting diode R_LD2.

One electrode of the storage capacitor Cst2 is connected to a first power voltage line ELVDD, and the other electrode of the storage capacitor Cst2 is connected to a gate electrode of the transistor M1.

One electrode of the transistor M1 is connected to the other electrode (i.e., an electrode other than an electrode connected to the first power voltage line ELVDD or a gate electrode) of the transistor M5, the other electrode of the transistor M1 is connected to one electrode of the transistor M6, and the gate electrode of the transistor M1 is connected to the other electrode of the storage capacitor Cst2. The transistor M1 may be referred to as a driving transistor. The transistor M1 determines an amount of driving current flowing between the first power voltage line ELVDD and a second power voltage line ELVSS according to a potential difference between the gate electrode and a source electrode.

One electrode of the transistor M2 is connected to a data line DLj, the other electrode of the transistor M2 is connected to the one electrode of the transistor M1, and a gate electrode of the transistor M2 is connected to a current scan line SLi. The transistor M2 may be referred to as a switching transistor, a scan transistor or the like. The transistor M2 allows a data voltage of the data line DLj to be input to the pixel RPij' when a turn-on level scan signal is applied to the current scan line SLi.

One electrode of the transistor M3 is connected to the other electrode of the transistor M1, the other electrode of the transistor M3 is connected to the gate electrode of the transistor M1, and a gate electrode of the transistor M3 is connected to the current scan line SLi. The transistor M3 connects the transistor M1 in a diode form when a turn-on level scan signal is applied to the current scan line SLi.

One electrode of the transistor M4 is connected to the gate electrode of the transistor M1, the other electrode of the transistor M4 is connected to an initialization voltage line VINT, and a gate electrode of the transistor M4 is connected to a previous scan line SL(i-1). In another embodiment, the gate electrode of the transistor M4 may be connected to another scan line. The transistor M4 transfers an initialization voltage to the gate electrode of the transistor M1 when a turn-on level scan signal is applied to the previous scan line SL(i-1), to initialize a charge quantity of the gate electrode of the transistor M1.

One electrode of the transistor M5 is connected to the first power voltage line ELVDD, the other electrode of the transistor M5 is connected to the one electrode of the transistor M1, and the gate electrode of the transistor M5 is connected to an emission line ELi. The one electrode of the transistor M6 is connected to the other electrode of the transistor M1, the other electrode of the transistor M6 is connected to an anode of the light emitting diode R_LD2, and a gate electrode of the transistor M6 is connected to the emission line ELi. Each of the transistors M5 and M6 may be referred to as an emission transistor. Each of the transistors M5 and M6 allows the light emitting diode R_LD2 to emit light by forming a driving current path between the first power voltage line ELVDD and the second power voltage line ELVSS when a turn-on level emission signal is applied to the emission line ELi.

One electrode of the transistor M7 is connected to the anode of the light emitting diode R_LD2, the other electrode of the seventh transistor M7 is connected to the initialization voltage line VINT, and a gate electrode of the transistor M7 is connected to the current scan line SLi. In another embodiment, the gate electrode of the transistor M7 may be connected to another scan line. For example, the gate electrode of the transistor M7 may be connected to the previous scan line SL(i−1), a previous scan line before the previous scan line SL(i−1), a next scan line (i+1)th scan line), or a next scan line after the (i+1)th scan line. The transistor M7 transfers the initialization voltage to the anode of the light emitting diode R_LD2 when a turn-on level scan signal is applied to the current scan line SLi, to initialization a charge quantity accumulated in the light emitting diode R_LD2.

The anode of the light emitting diode R_LD2 is connected to the other electrode of the transistor M6, and a cathode of the light emitting diode R_LD2 is connected to the second power voltage line ELVSS.

Figure 6:
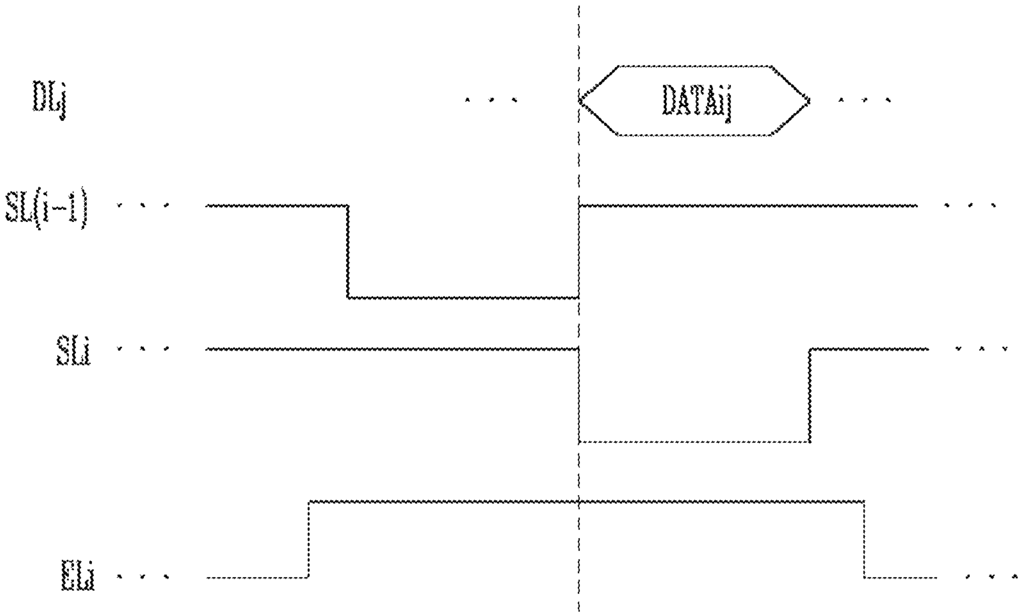
FIG. 6 is a diagram illustrating an exemplary driving method of the pixel of FIG. 5.

FIG. 6 is a diagram illustrating an exemplary driving method of the pixel of FIG. 5.

First, a turn-on level (low-level) scan signal is applied to the previous scan line SL(i−1). Because the transistor M4 is in a turn-on state, the initialization voltage is applied to the gate electrode of the transistor M1 such that the charge quantity of the gate electrode of the transistor M1 is initialized. Because a turn-off level emission signal is applied to the emission line ELi, the transistors M5 and M6 are in a turn-off state, and unnecessary emission of the light emitting diode R_LD2 in the process of applying the initialization voltage is prevented or reduced.

Next, a data voltage DATAij of a current pixel row is applied to the data line DLj, and a turn-on level scan signal is applied to the current scan line SLi. Accordingly, the transistors M2, M1, and M3 are in a conduction state, and the data line DLj and the gate electrode of the transistor M1 are electrically connected. Thus, the data voltage DATAij is applied to the other electrode of the storage capacitor Cst2, and the storage capacitor Cst2 accumulates a charge quantity corresponding to the difference between the voltage of the first power voltage line ELVDD and the data voltage DATAij.

Because the transistor M7 is in the turn-on state, the anode of the light emitting diode R_LD2 and the initialization voltage line VINT are electrically connected, and the light emitting diode R_LD2 is precharged or initialized to a charge quantity corresponding to the difference between the initialization voltage and the voltage of the second power voltage line ELVSS.

Subsequently, when a turn-on level emission signal is applied to the emission line ELi, the transistors M5 and M6 are in the conduction state, and the amount of driving current flowing through the transistor M1 is adjusted depending on a charge quantity accumulated in the storage capacitor Cst2, so that the driving current flows through the light emitting diode R_LD2. The light emitting diode R_LD2 emits light until before a turn-off level emission signal is applied to the emission line ELi.

Figure 7:
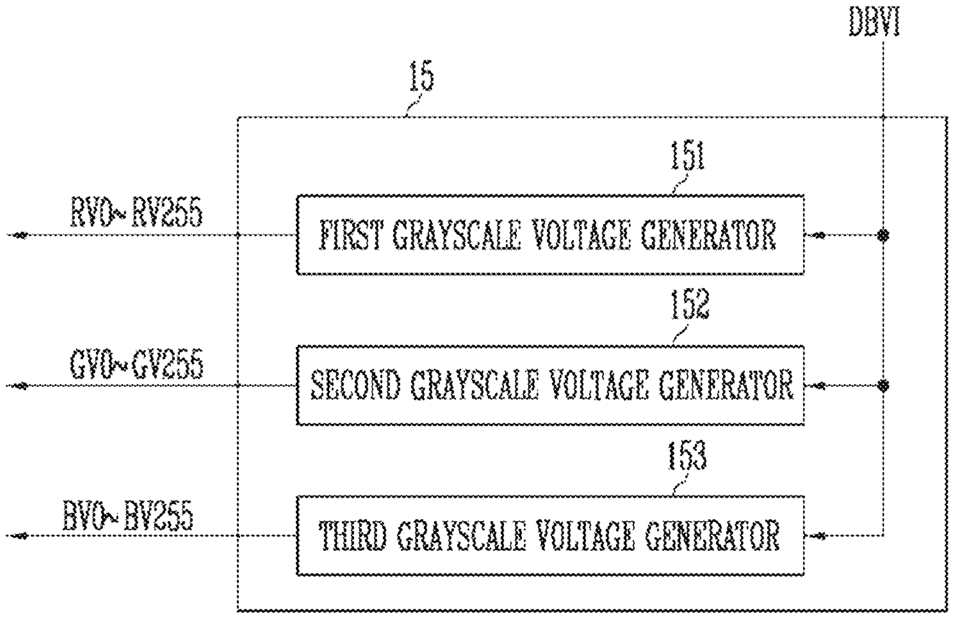
FIG. 7 is a diagram illustrating a grayscale voltage generator according to an embodiment of the present disclosure.

FIG. 7 is a diagram illustrating a grayscale voltage generator according to an embodiment of the present disclosure.

The grayscale voltage generator may include a first grayscale voltage generator 151, a second grayscale voltage generator 152, and a third grayscale voltage generator 153.

The first grayscale voltage generator 151 may receive an input maximum luminance value DBVI, and provide grayscale voltages RV0 to RV255 with respect to pixels of the first color, which correspond to the input maximum luminance value DBVI.

The second grayscale voltage generator 152 may receive the input maximum luminance value DBVI, and provide grayscale voltages GV0 to GV255 with respect to pixels of the second color, which correspond to the input maximum luminance value DBVI.

The third grayscale voltage generator 153 may receive the input maximum luminance value DBVI, and provide grayscale voltages BV0 to BV255 with respect to pixels of the third color, which correspond to the input maximum luminance value DBVI.

Figure 8:
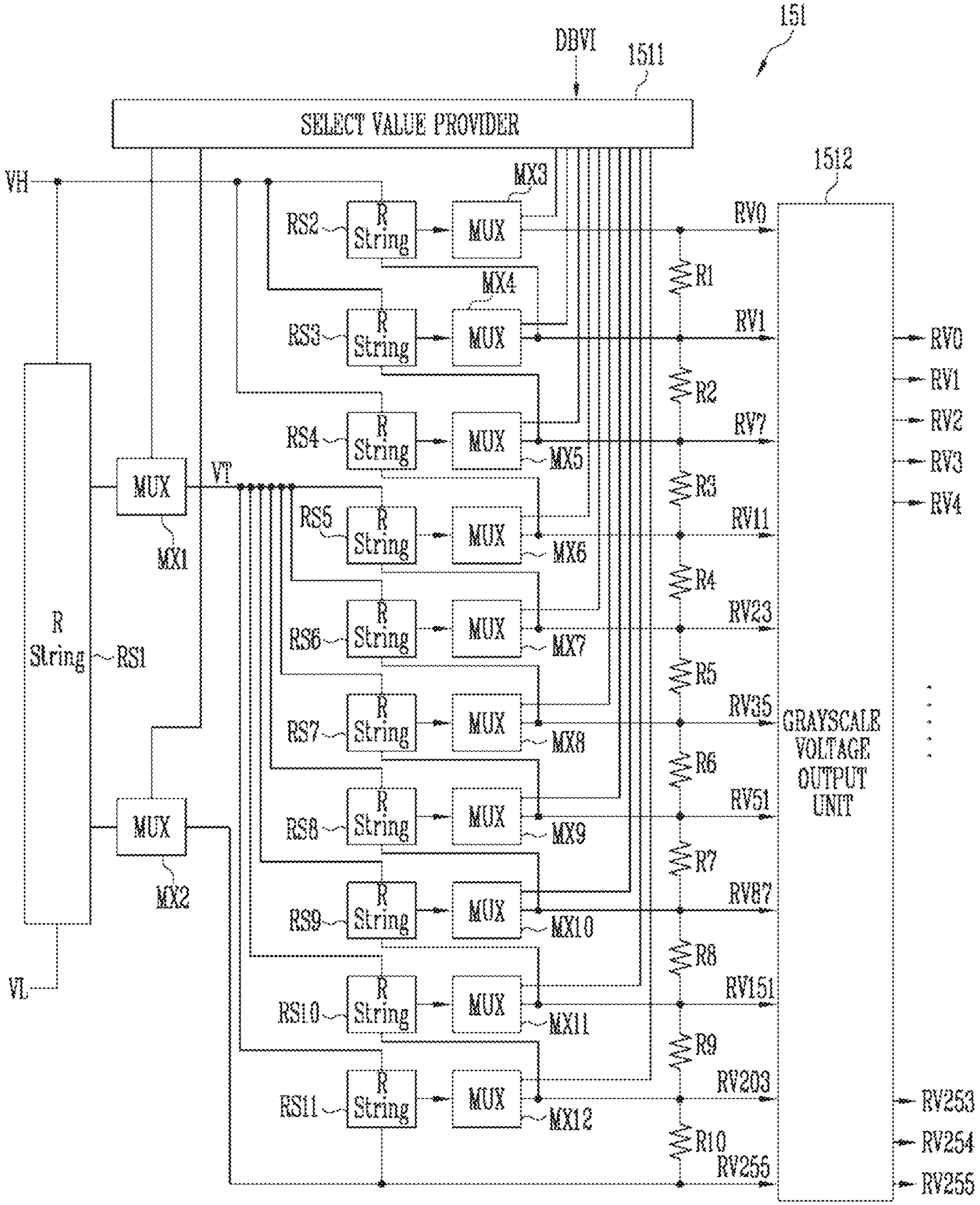
FIG. 8 is a diagram illustrating an exemplary portion of the grayscale voltage generator of FIG. 7.

FIG. 8 is a diagram illustrating an exemplary portion of the grayscale voltage generator of FIG. 7.

Referring to FIG. 8, the first grayscale voltage generator 151 may include a select value provider 1511, a grayscale voltage output unit 1512, resistor strings RS1 to RS11, multiplexers MX1 to MX12, and resistors R1 to R10.

The second grayscale voltage generator 152 and the third grayscale voltage generator 153 may include components substantially identical to those of the first grayscale voltage generator 151, and therefore, overlapping descriptions may be omitted.

The select value provider 1511 may provide select values with respect to the multiplexers MX1 to MX12 according to the input maximum luminance value DBVI. The select values according to the input maximum luminance value DBVI may be stored in advance in a memory element, e.g., an element such as a register.

The resistor string RS1 may generate intermediate voltages between a first reference voltage VH and a second reference voltage VL. The multiplexer MX1 may output a third reference voltage VT by selecting one of the intermediate voltages provided from the resistor string RS1 according to a select value. The multiplexer MX2 may output grayscale voltage 255 RV255 by selecting one of the intermediate voltages provided from the resistor string RS1 according to a select value.

The resistor string RS11 may generate intermediate voltages between the third reference voltage VT and the grayscale voltage 255 RV255. The multiplexer MX12 may output grayscale voltage 203 RV203 by selecting one of the intermediate voltages provided from the resistor string RS11 according to a select value.

The resistor string RS10 may generate intermediate voltages between the third reference voltage VT and the grayscale voltage 203 RV203. The multiplexer MX11 may output grayscale voltage 151 RV151 by selecting one of the intermediate voltages provided from the resistor string RS10 according to a select value.

The resistor string RS9 may generate intermediate voltages between the third reference voltage VT and the grayscale voltage 151 RV151. The multiplexer MX10 may output grayscale voltage 87 RV87 by selecting one of the intermediate voltages provided from the resistor string RS9 according to a select value.

The resistor string RS8 may generate intermediate voltages between the third reference voltage VT and the grayscale voltages 87 RV87. The multiplexer MX9 may output grayscale voltage 51 RV51 by selecting one of the intermediate voltages provided from the resistor string RS8 according to a select value.

The resistor string RS7 may generate intermediate voltages between the third reference voltage VT and the grayscale voltage 51 RV51. The multiplexer MX8 may output grayscale voltage 35 RV35 by selecting one of the intermediate voltages provided from the resistor string RS7 according to a select value.

The resistor string RS6 may generate intermediate voltages between the third reference voltage VT and the grayscale voltage 35 RV35. The multiplexer MX7 may output grayscale voltage 23 RV23 by selecting one of the intermediate voltages provided from the resistor string RS6 according to a select value.

The resistor string RS5 may generate intermediate voltages between the third reference voltage VT and the grayscale voltage 23 RV23. The multiplexer MX6 may output grayscale voltage 11 RV11 by selecting one of the intermediate voltages provided from the resistor string RS5 according to a select value.

The resistor string RS4 may generate intermediate voltages between the first reference voltage VH and the grayscale voltage 11 RV11. The multiplexer MX5 may output grayscale voltage 7 RV7 by selecting one of the intermediate voltages provided from the resistor string RS4 according to a select value.

The resistor string RS3 may generate intermediate voltages between the first reference voltage VH and the grayscale voltage 7 RV7. The multiplexer MX4 may output grayscale voltage 1 RV1 by selecting one of the intermediate voltages provided from the resistor string RS3 according to a select value.

The resistor string RS2 may generate intermediate voltages between the first reference voltage VH and the grayscale voltage 1 RV1. The multiplexer MX3 may output grayscale voltage 0 RV0 by selecting one of the intermediate voltages provided from the resistor string RS2 according to a select value.

The above-described grayscale levels 0, 1, 7, 11, 23, 35, 51, 87, 151, 203, and 255 may be referred to as reference grayscale levels. In addition, the grayscale voltages RV0, RV1, RV7, RV11, RV23, RV35, RV51, RV87, RV151, RV203, and RV255 generated from the multiplexers MX2 to MX12 may be referred to as reference grayscale voltages. The number of reference grayscale levels and grayscale numbers corresponding to the reference grayscale levels may be differently set depending on products. Hereinafter, for convenience of description, the grayscale levels 0, 1, 7, 11, 23, 35, 51, 87, 151, 203, and 255 are described as reference grayscale levels.

The grayscale voltage output unit 1512 may generate all grayscale voltages RV0 to RV255 by dividing the reference grayscale voltages RV0, RV1, RV7, RV11, RV23, RV35, RV51, RV87, RV151, RV203, and RV255. For example, the grayscale voltage output unit 1512 may generate grayscale voltages RV2 to RV6 by dividing reference grayscale voltages RV1 and RV7.

Figure 9:
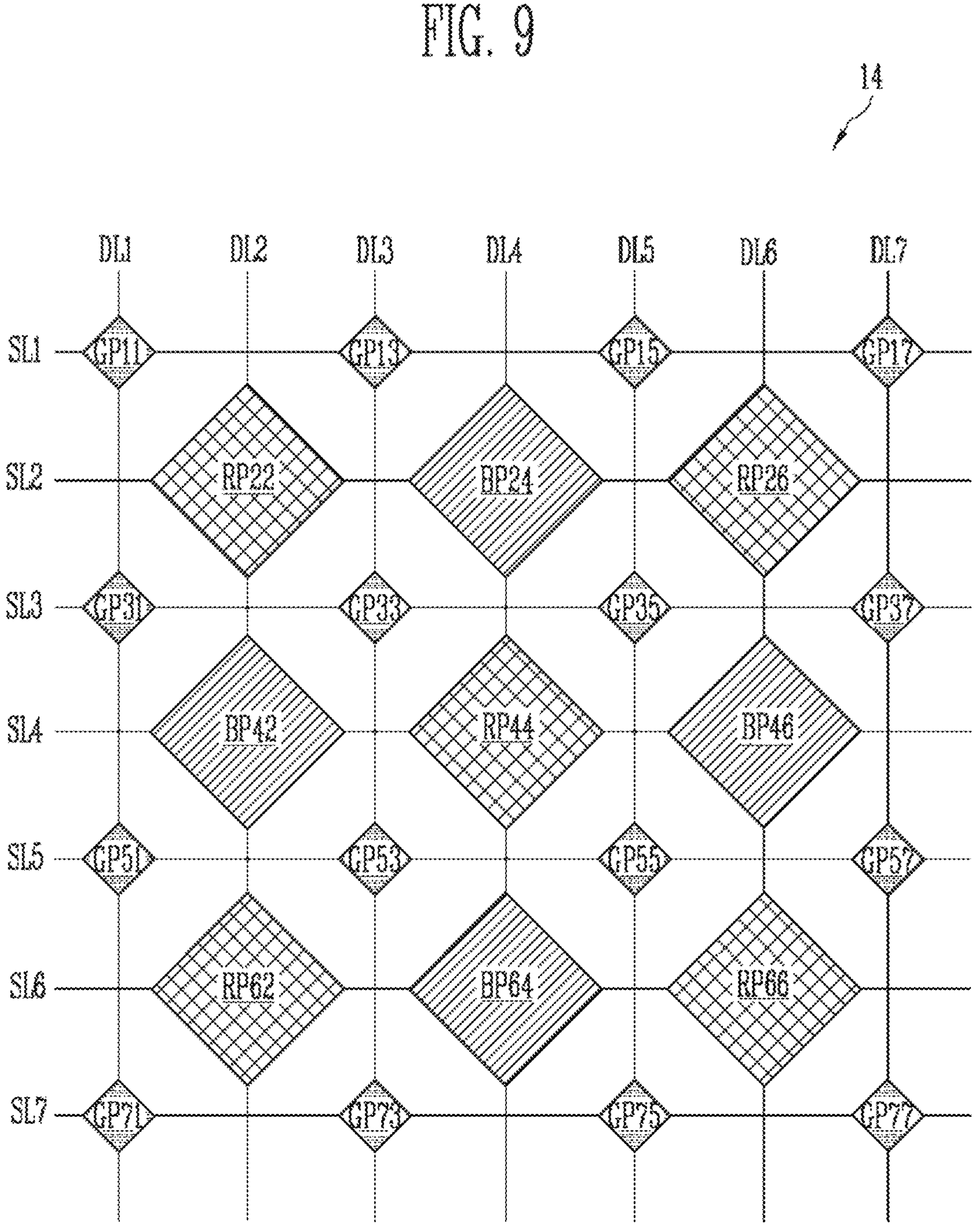
FIGS. 9-10 are diagrams illustrating a case where pixels emit a white color light according to a maximum luminance value.
Figure 10:
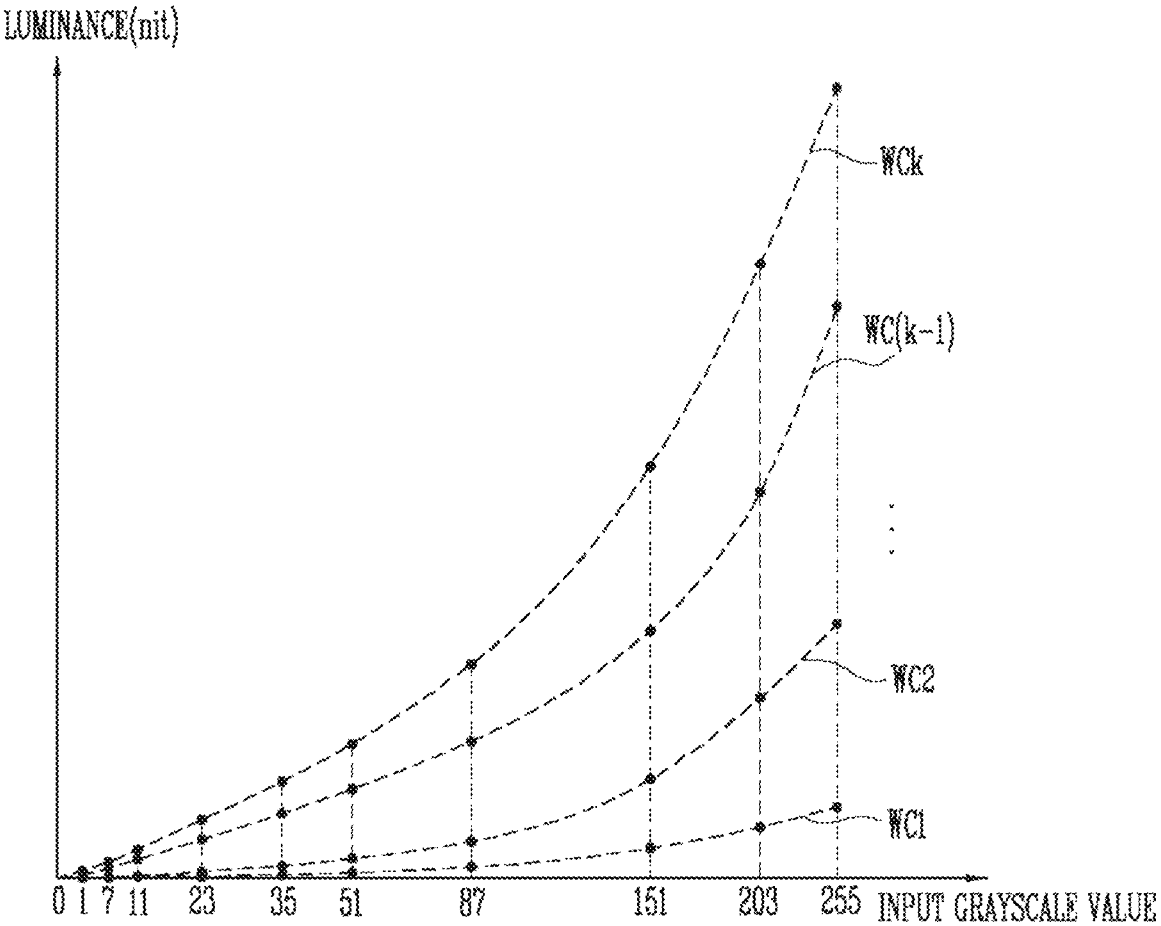

FIGS. 9-10 are diagrams illustrating a case where pixels emit a white color light according to a maximum luminance value.

Referring to FIG. 9, an arrangement example of the pixels 14 is partially illustrated. As described above, FIG. 9 is illustrated based on the positions of light emitting diodes of the pixels 14, and scan lines SL1 to SL7 and data lines DL1 to DL7 are illustrated to describe an electrical connection of the pixels 14.

First pixels RP22 to RP66 may be pixels emitting lights of the first color. Second pixels GP11 to GP77 may be pixels emitting lights of the second color. The third pixels BP24 to BP64 may be pixels emitting lights of the third color.

In some embodiments, data voltages corresponding to grayscale voltages may be alternately applied to data lines DL1, DL3, DL5, and DL7 of a first group and data lines DL2, DL4, and DL6 of a second group.

For example, data voltages corresponding to the second color may be applied to the data lines DL1, DL3, DL5, and DL7 of the first group. When a turn-on level scan signal is applied to a scan line SL1, the corresponding data voltages are written in pixels GP11, GP13, GP15, and GP17. When a turn-on level scan signal is applied to a scan line SL3, the corresponding data voltages are written in pixels GP31, GP33, GP35, and GP37. When a turn-on level scan signal is applied to a scan line SL5, the corresponding data voltages are written in pixels GP51, PG53 GP55, and GP57. When a turn-on level scan signal is applied to a scan line SL7, the corresponding data voltages are written in pixels GP71, GP73, GP75, and GP77.

In addition, data voltages corresponding to the first color or the third color may be applied to the data lines DL2, DL4, and DL6 of the second group. When a turn-on level scan signal is applied to a scan line SL2, the corresponding data voltages are written in pixels RP22, BP24, and RP26. When a turn-on level scan signal is applied to a scan line SL4, the corresponding data voltages are written in pixels BP42, RP44, and BP46. When a turn-on level scan signal is applied to a scan line SL6, the corresponding data voltages are written in pixels RP62, BP64, and RP66.

FIG. 10 illustrates a white color light curves WC1, WC2, . . . , WC(k-1), and WCk of output luminance with respect to input grayscale value. Here, k may be a natural number.

Maximum luminance values of the white color light curves WC1 to WCk may be different from each other. For example, the maximum luminance value (e.g., 4 nits) of the white color light curve WC1 may be the lowest, and the maximum luminance value (e.g., 1200 nit) of the white color light curve WCk may be the highest.

In order to generate a white color light, it is assumed that the pixels 14 of all colors receive data voltages with respect to the same grayscale.

Imaginary dots illustrated on the white color light curves WC1 to WCk of FIG. may correspond to the above-described select values stored in advance in the select value provider 1511. When the number of select values increases, more accurate white color light curves can be directly expressed. However, additional physical elements such as multiplexers and registers, which correspond to the increased select values, may be required, and hence a limitation exists. Therefore, select values with respect to the above-described reference grayscale voltages may be stored in advance and used, and other grayscale voltages may be divided and generated. In addition, for the same reason, select values with respect to some maximum luminance values (e.g., reference maximum luminance values) between 4 nit and 1200 nit may be stored in advance and used, and select values with respect to other maximum luminance values may be interpolated and generated.

The select values stored in advance may be set for every individual product through multi-time programming (MTP). That is, the select values may be set through repetitive measurement to be stored in a product such that a white color light with a desired luminance with respect to input grayscale values is emitted.

That is, the select values stored in advance may be values set based on a white color light. As described above, when a mixed color light or a single color light is emitted using the set grayscale voltages, the luminance of the mixed color light or the single color light does not accurately correspond to a desired gamma curve. The gamma curve may correspond to a white color light curve.

FIGS. 11-14 are diagrams illustrating a case where the pixels emit a single color light.

Figure 11:
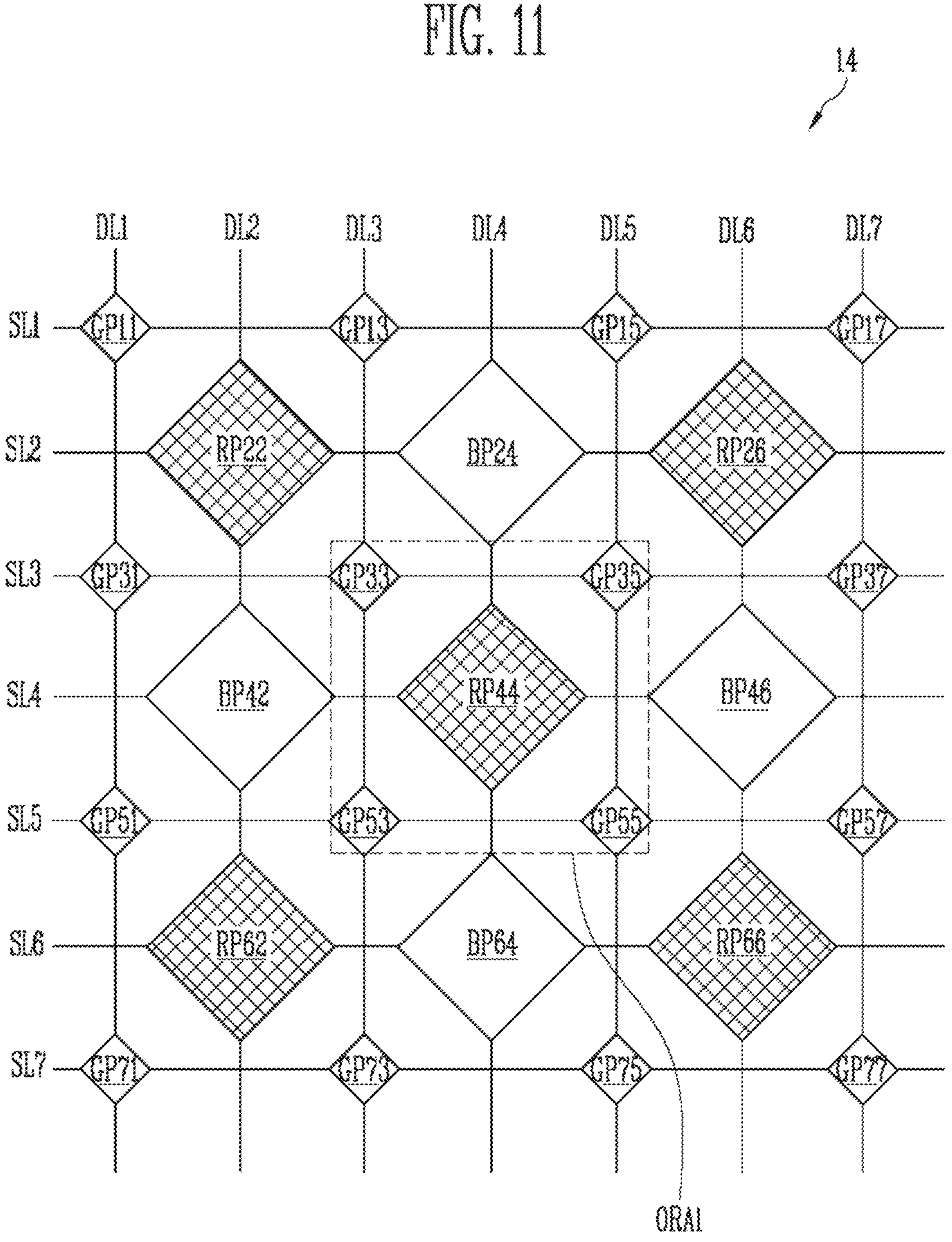
FIGS. 11-14 are diagrams illustrating a case where the pixels emit a single color light.

Referring to FIG. 11, a case where the first pixels RP22 to RP66 emit light, and the second pixels GP11 to GP77 and the third pixels BP24 to BP64 do not emit lights is illustrated. That is, in FIG. 11, the pixels 14 emit a single color light of the first color.

Emission and non-emission may be distinguished according to an input grayscale value. That is, a pixel provided with an input grayscale value exceeding a reference value may be classified as an emission pixel, and a pixel provided with an input grayscale value equal to or less than the reference value may be classified as a non-emission pixel. For example, the reference value may be set to grayscale level 0. In another embodiment, the reference value may be set to a low grayscale level.

In this embodiment, a target pixel and observation target pixels may be defined so as to distinguish a single color, a mixed color, and a white color for each unit area of an image frame. For example, the pixel RP44 located at the center of a unit area ORA1 may be a target pixel, and the pixels GP33, GP35, GP53, and GP55 adjacent to the target pixel RP44 may be observation target pixels. For example, the observation target pixels GP33, GP35, GP53, and GP55 may be set as pixels most adjacent (i.e., closest or nearest) to the target pixel RP44. Whether the observation target pixels GP33, GP35, GP53, and GP55 are most adjacent to the target pixel RP44 may be determined according to a distance between a center of the target pixel RP 44 and centers of the observation target pixels GP33, GP35, GP53, and GP55.

When the unit area ORA1 emits light of one of the first to third colors, the unit area ORA1 may emit a single color light. In FIG. 11, only the target pixel RP44 emits light in the unit area ORA1, and thus the unit area ORA1 emits a single color light of the first color.

When all the pixels GP33, GP35, RP44, GP53, and GP55 included in the unit area ORA1 emit light, the unit area ORA1 may emit a white color light. Input grayscale values of the pixels GP33, GP35, RP44, GP53, and GP55 may be the same or be different within an allowable range.

When the unit area ORA1 emits light different from the single color light or the white color light, the unit area ORA1 may emit a mixed color light. The mixed color light will be described later with reference to FIGS. 23-25.

When the size of the unit area ORA1 decreases, less computing resources for distinguishing between a single color, a mixed color, and a white color are used or required. When the size of the unit area ORA1 increases, the single color, the mixed color, and the white color can be more accurately (e.g., accurately) distinguished. Hereinafter, for convenience of description, a case where the unit area ORA1 includes five pixels is assumed and described.

Figure 12:
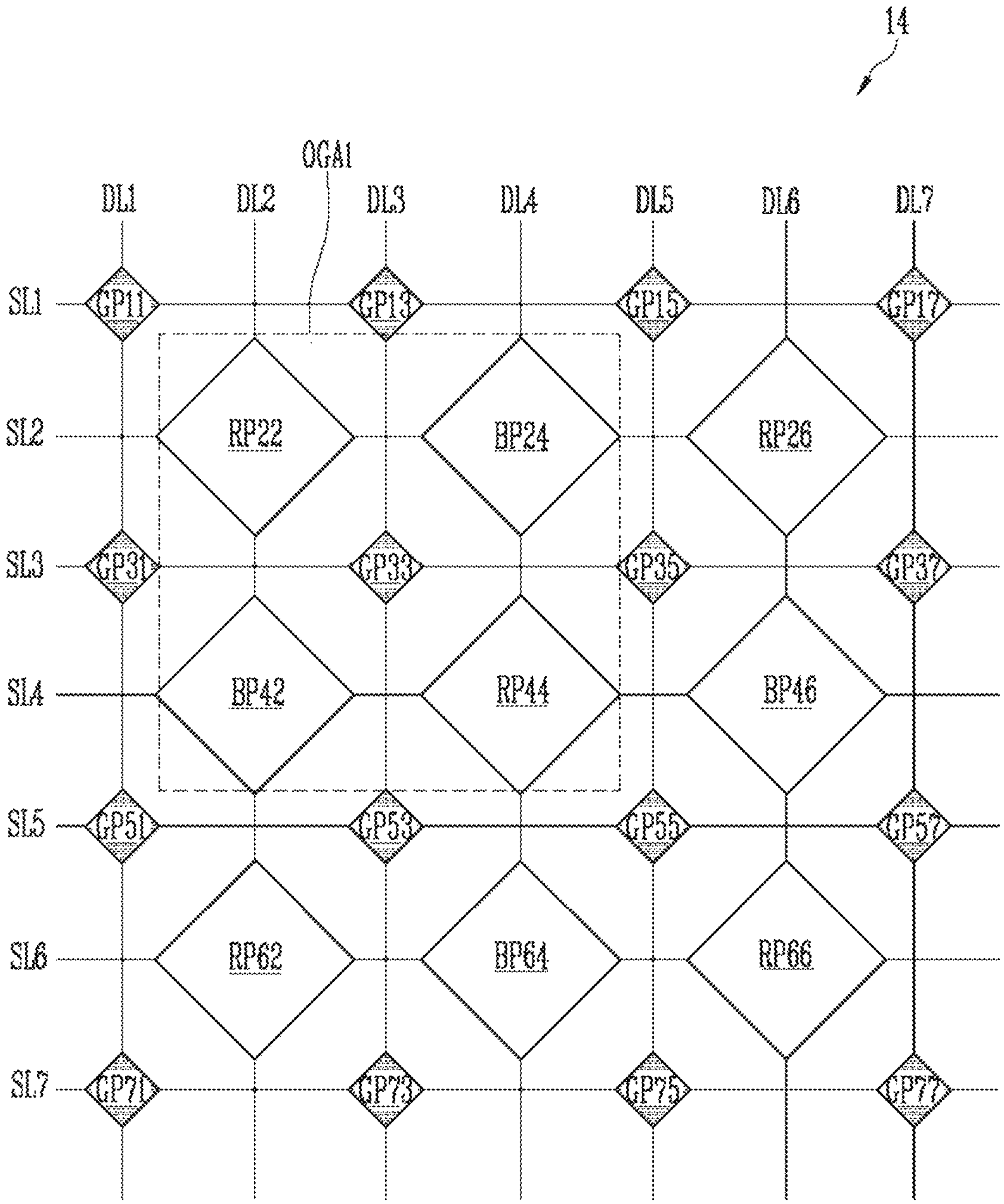

Referring to FIG. 12, a case where the second pixels GP11 to GP77 emit light, and the first pixels RP22 to RP55 and the third pixels BP24 to BP64 do not emit light is illustrated. That is, in FIG. 12, the pixels 14 emit a single color light of the second color.

A unit area OGA1 may include a target pixel GP33 and observation target pixels RP22, BP24, BP42, and RP44. In FIG. 12, the unit area OGA1 emits a single color light of the second color.

Figure 13:
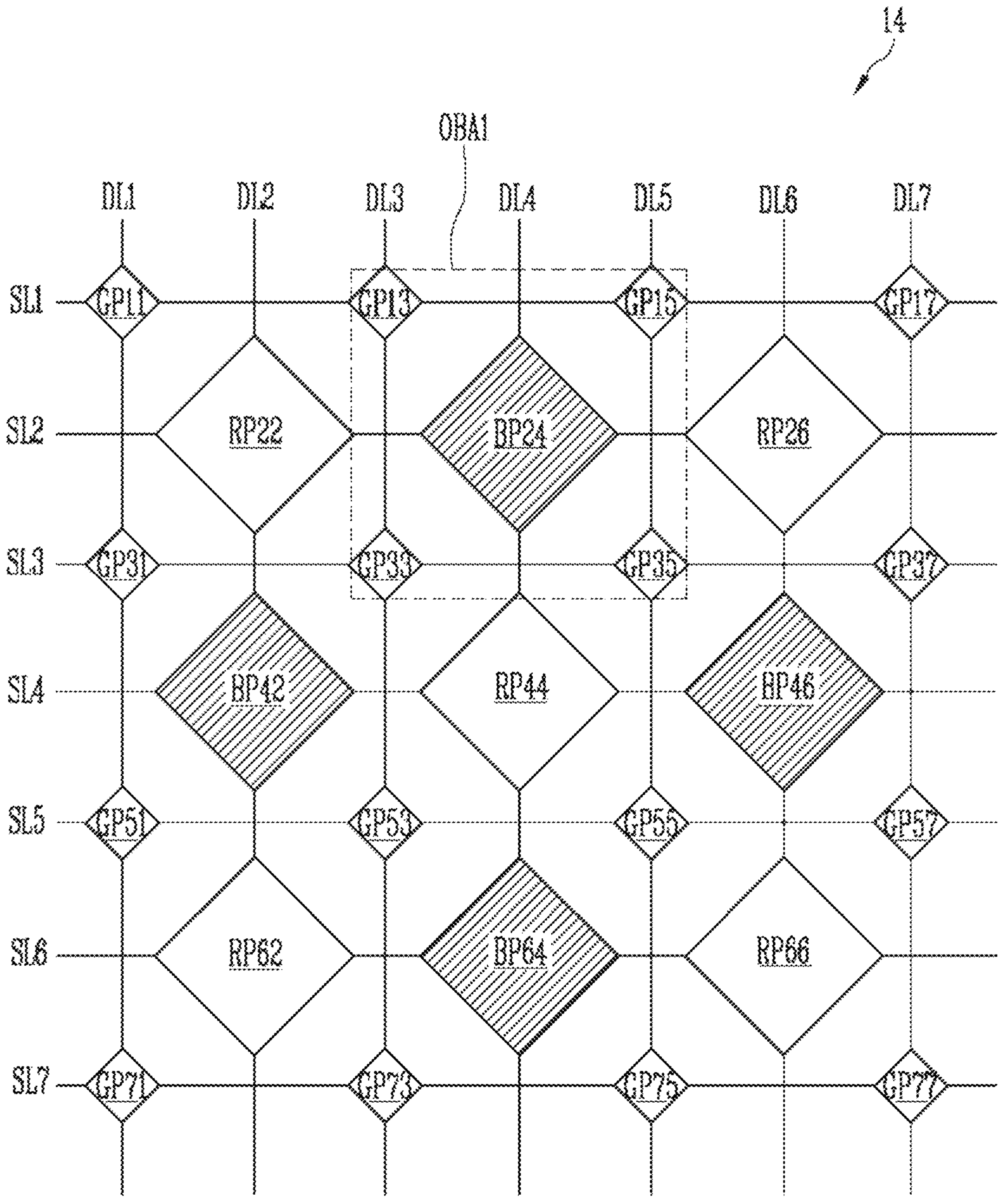

Referring to FIG. 13, a case where the third pixels BP24 to BP64 emit light, and the second pixels GP11 to GP77 and the first pixels RP22 to RP66 do not emit light is illustrated. That is, in FIG. 13, the pixels 14 emit a single color light of the third color.

A unit area OBA1 may include a target pixel BP24 and observation target pixels GP13, GP15, GP33, and GP35. In FIG. 13, the unit area OBA1 may emit a single color light of the third color.

Figure 14:
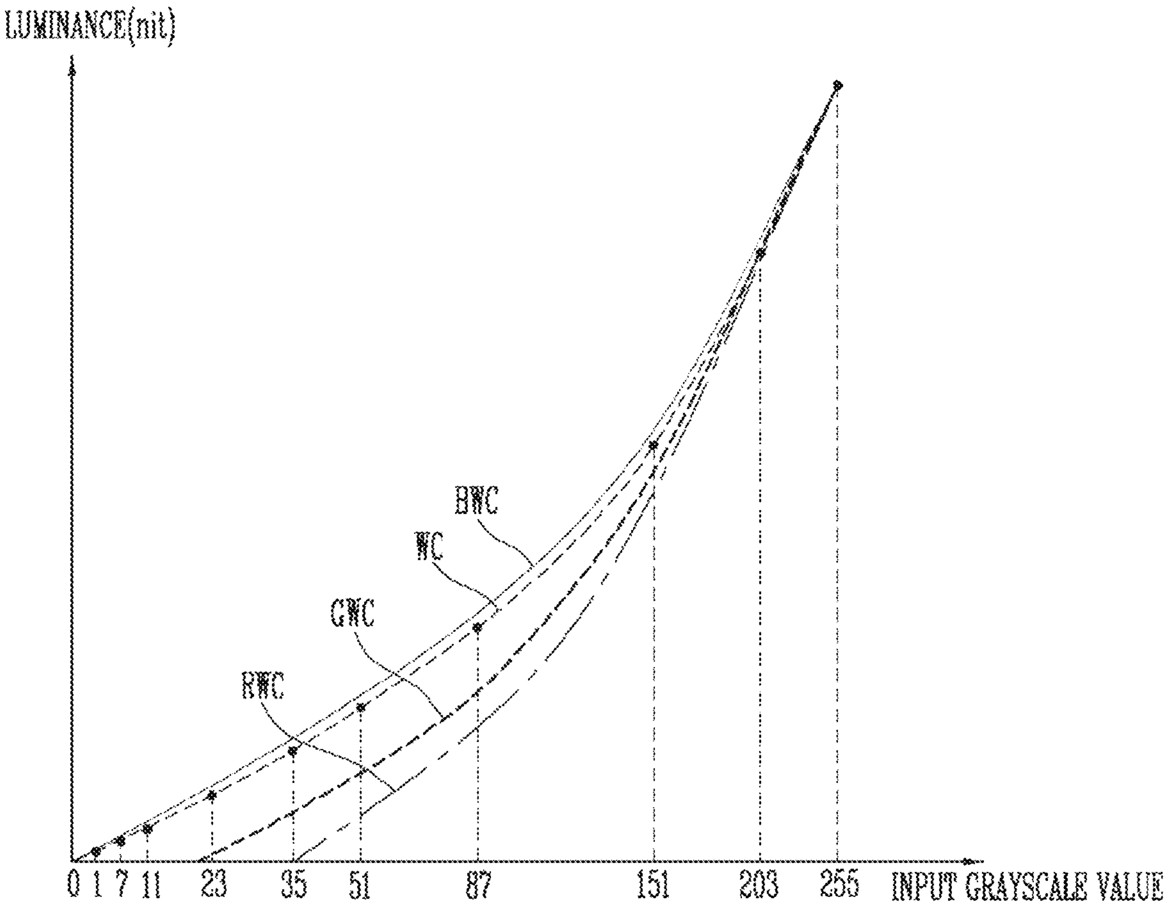

Referring to FIG. 14, a white color light curve WC, a first single color light curve RWC, a second single color light curve GWC, and a third single color light curve BWC at an arbitrary maximum luminance value are illustrated.

As described above, when a single color light instead of a white color light is emitted using set grayscale voltages, the luminance of the single color light does not accurately correspond to a desired gamma curve. The gamma curve may correspond to the white color light curve WC. In addition, an expression of low-grayscale levels may be unclear because the luminance difference between low grayscale levels may be insufficient.

The gamma curve may generally follow the following Equation 1.

$$y = ax^{GM} + b \qquad \text{Equation 1}$$

Here, x is a grayscale value, y is a luminance value, a and b are arbitrary constants, and GM is a gamma value.

Hereinafter, for convenience of description, the constants a and b are neglected, and shapes of the curves are described using the gamma value GM. When the gamma value corresponds to 1, a straight line is drawn instead of a curve. When the gamma value is greater than 1, the curve protrudes adjacent to (e.g., towards) the x-axis.

Therefore, a gamma value of the first single color light curve RWC may be greater than that of the white color light curve WC. In addition, a gamma value of the second single color light curve GWC may be greater than that of the white color light curve WC and be less than that of the first single color light curve RWC. In addition, a gamma value of the third single color light curve BWC may be less than that of the white color light curve WC. For example, the first color may be red, the second color may be green, and the third color may be blue.

Therefore, although the same input grayscale value is expressed when a single color light is emitted and when a white color light is emitted, the select values of the select value provider 1511 may be different from each other. However, as described above, when the select values of the select value provider 1511 are directly increased, additional physical elements such as multiplexers may be required, which is not preferable.

Thus, in this embodiment, there is used a method of checking whether unit areas emit a single color light, a mixed color light or a white color light, and for correcting an input grayscale value to a converted grayscale value in some cases. When the method is used, it may be unnecessary to modify the existing grayscale voltage generator 15, and hence products can be easily configured.

By using the case of FIG. 14 as an example, the gamma value of the first single color light curve RWC is adjusted by correcting the input grayscale value. Therefore, the gamma value of the first single color light curve RWC may be adjusted such that the first single color curve RWC is similar to the white color light curve WC. For example, the gamma value of the first single color light curve RWC may be adjusted to decrease.

Similarly, the gamma value of the second single color light curve GWC is adjusted by correcting the input grayscale value. Therefore, the gamma value of the second single color light curve GWC may be adjusted such that the second single color curve GWC is similar to the white color light curve WC. For example, the gamma value of the second single color light curve GWC may be adjusted to decrease. A decrement of the gamma value of the second single color light curve GWC may be less than that of the gamma value of the first single color light curve RWC.

Similarly, the gamma value of the third single color light curve BWC is adjusted by correcting the input grayscale value. Therefore, the gamma value of the third single color light curve BWC may be adjusted such that the third single color curve BWC is similar to the white color light curve WC. For example, the gamma value of the third single color light curve BWC may be adjusted to increase.

According to the above-described embodiments, luminances of single color lights can be more accurately (e.g., accurately) expressed according to a desired gamma curve. Further, low-grayscale expression may be clearer.

Figure 15:
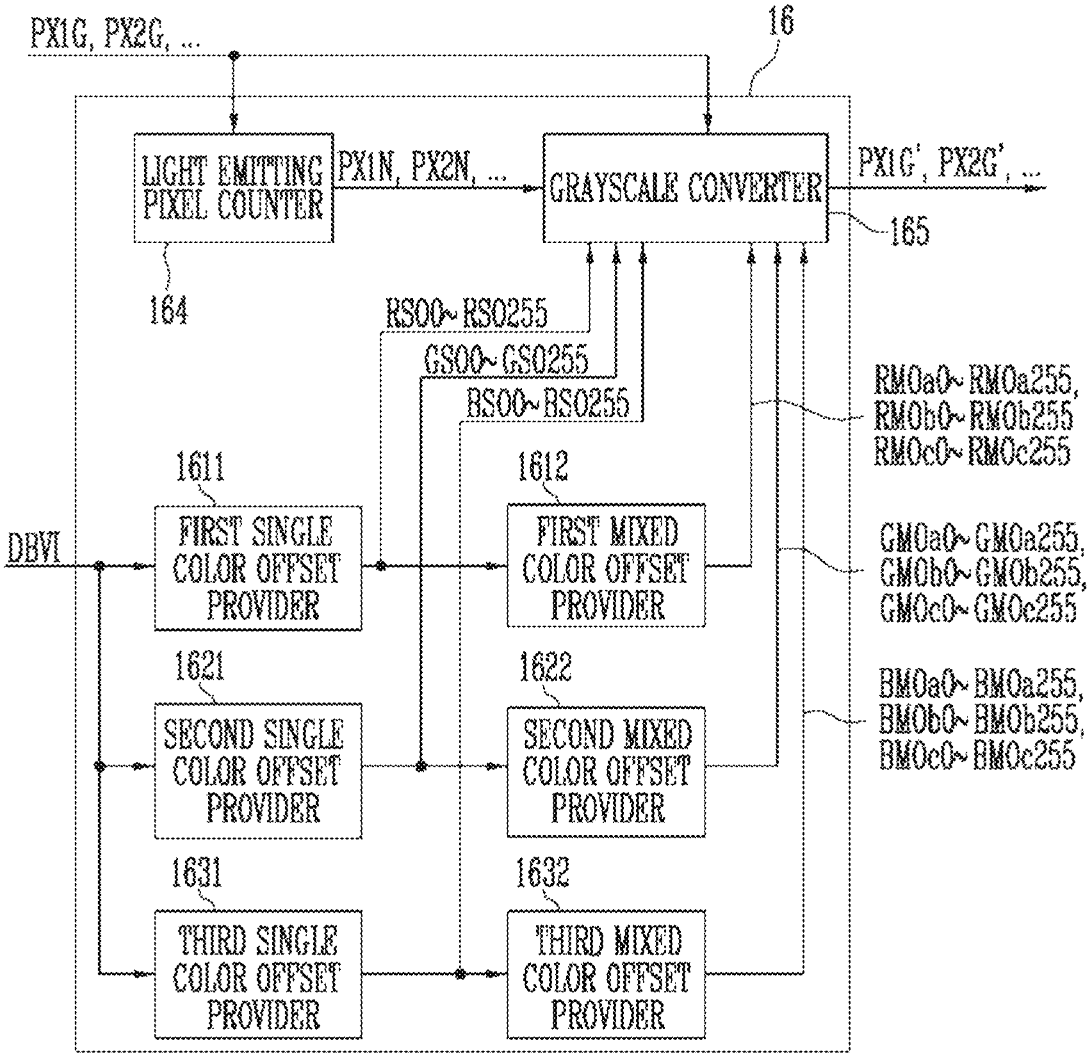
FIG. 15 is a diagram illustrating a grayscale corrector according to an embodiment of the present disclosure.

FIG. 15 is a diagram illustrating a grayscale corrector according to an embodiment of the present disclosure.

Referring to FIG. 15, in some embodiments, the grayscale corrector 16 may selectively include a light emitting pixel counter 164, a grayscale converter 165, single color offset providers 1611, 1621, and 1631, and mixed color offset providers 1612, 1622, and 1632.

The grayscale corrector 16 may convert an input grayscale value provided corresponding to a target pixel with reference to observation target grayscale values provided corresponding to observation target pixels. For example, the grayscale corrector 16 may provide converted grayscale values PX1G', PX2G', . . . by converting input grayscale values PX1G, PX2G, . . . provided corresponding to the pixels 14. Hereinafter, each of the input grayscale values PX1G, PX2G, . . . is expressed as an input grayscale value when it is referred to as a grayscale value of a target pixel, and is expressed as an observation target grayscale value when it is referred to as a grayscale value of an observation target pixel.

The light emitting pixel counter 164 may provide a number of light emitting pixels by counting a number of observation target grayscale values that exceed a reference value. For example, the light emitting pixel counter 164 may provide numbers PX1N, PX2N, . . . of light emitting pixels in a unit area in which each of the pixels 14 is used as a target pixel, using the input grayscale values PX1G, PX2G, . . . .

For example, referring to FIG. 11, the observation target grayscale values of the observation target pixels GP33, GP35, GP53, and GP55 in the unit area ORA1 may be grayscale levels that are equal to or less than grayscale level 0 or the reference value. Accordingly, the observation target pixels GP33, GP35, GP53, and GP55 may all be determined that they are in a non-emission state. Therefore, the light emitting pixel counter 165 may determine the number of light emitting pixels with respect to the target pixel RP44 as 0.

Figure 23:
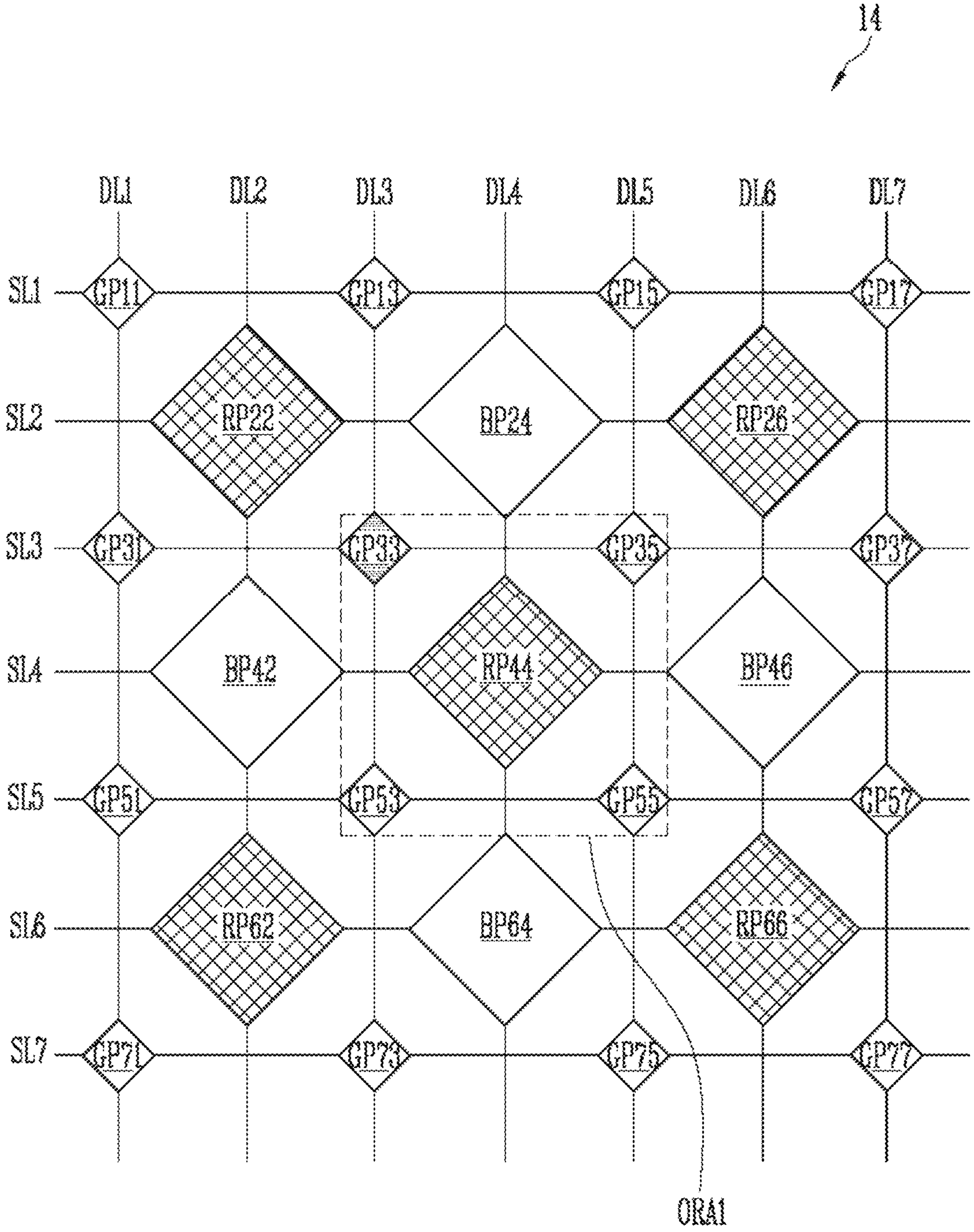
FIGS. 23-27 are diagrams illustrating a mixed color offset provider of FIG. 15.

Referring to FIG. 23 in advance, the observation target grayscale value of the observation target pixel GP33 in the unit area ORA1 may exceed the reference value. In addition, the observation target grayscale values of the observation target pixels GP35, GP53, and GP55 may be grayscale levels that are equal to or less than the grayscale level 0 or the reference value. Accordingly, the observation target pixel GP33 may be determined that it is in an emission state, and the observation target pixels GP35, GP53, and GP55 may be determined that they are in the non-emission state. Therefore, the light emitting pixel counter 164 may determine the number of light emitting pixels with respect to the target pixel RP44 as 1.

Figure 24:
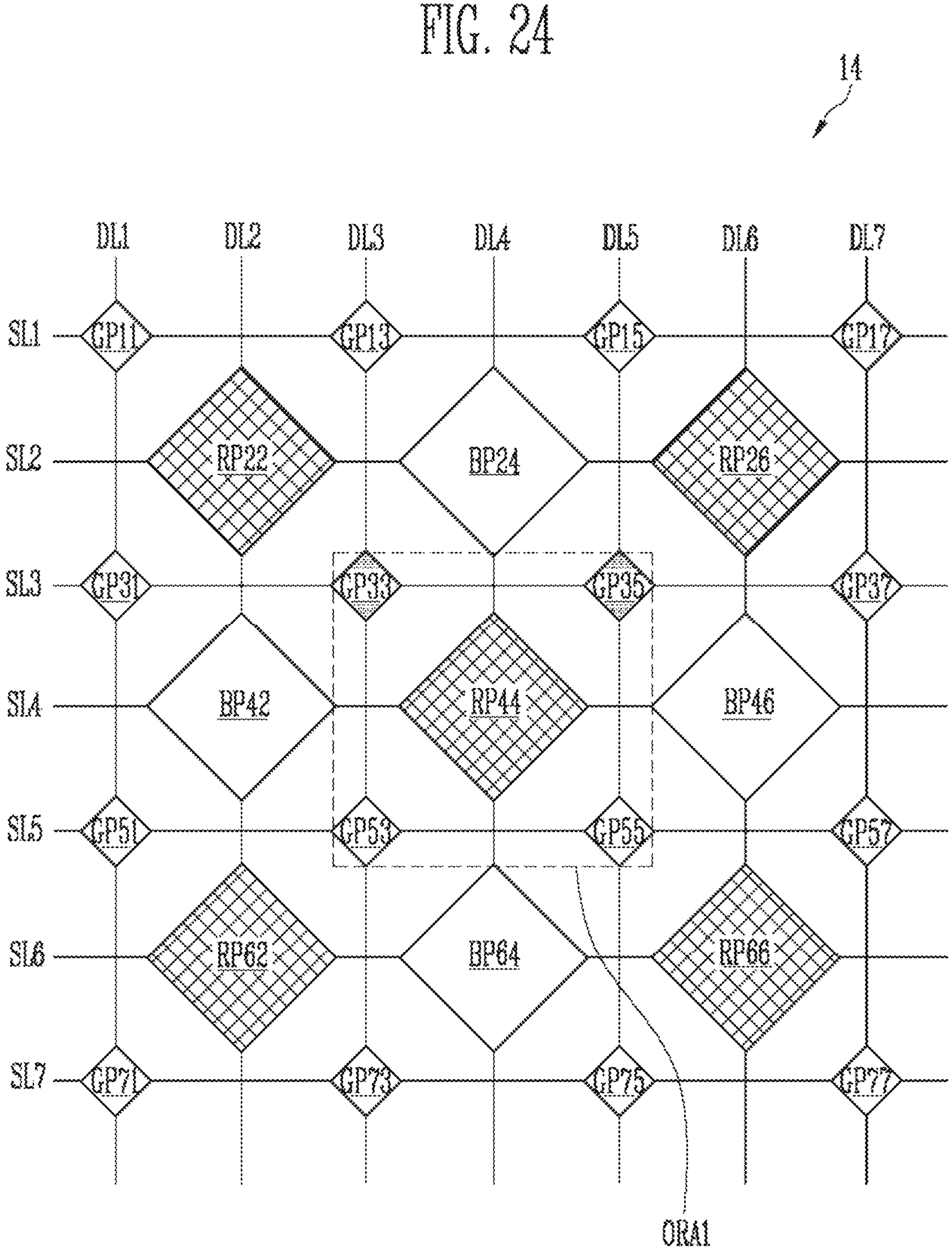

Referring to FIG. 24 in advance, the observation target grayscale values of the observation target pixels GP33 and GP35 in the unit area ORA1 may exceed the reference value. In addition, the observation target grayscale values of the observation target pixels GP53 and GP55 may be grayscale levels that are equal to or less than the grayscale level 0 or the reference value. Accordingly, the observation target pixels GP33 and GP35 may be determined that they are in the emission state, and the observation target pixels GP53 and GP55 may be determined that they are in the non-emission state. Therefore, the light emitting pixel counter 164 may determine the number of light emitting pixels with respect to the target pixel RP44 as 2.

Figure 25:
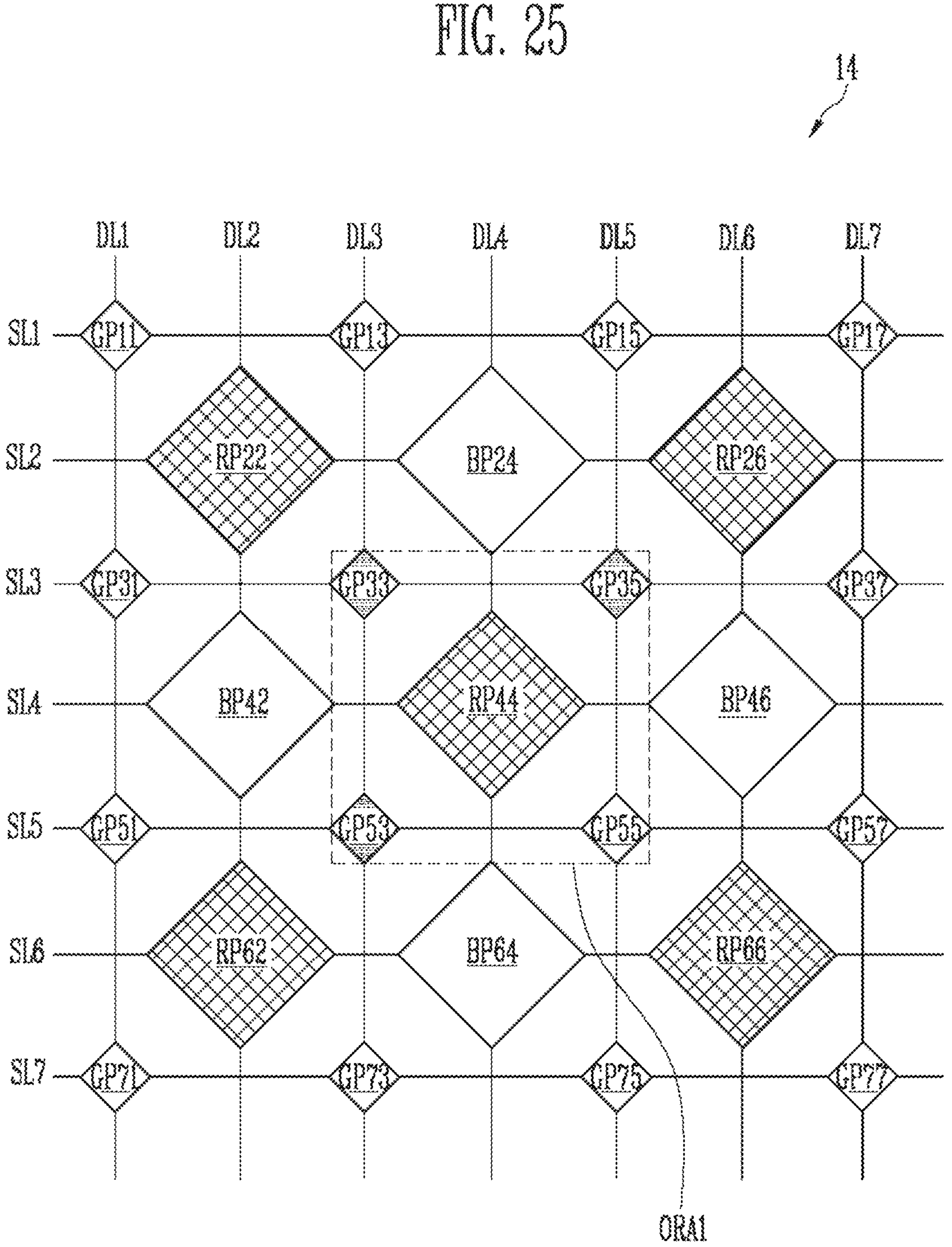
Figure 26:
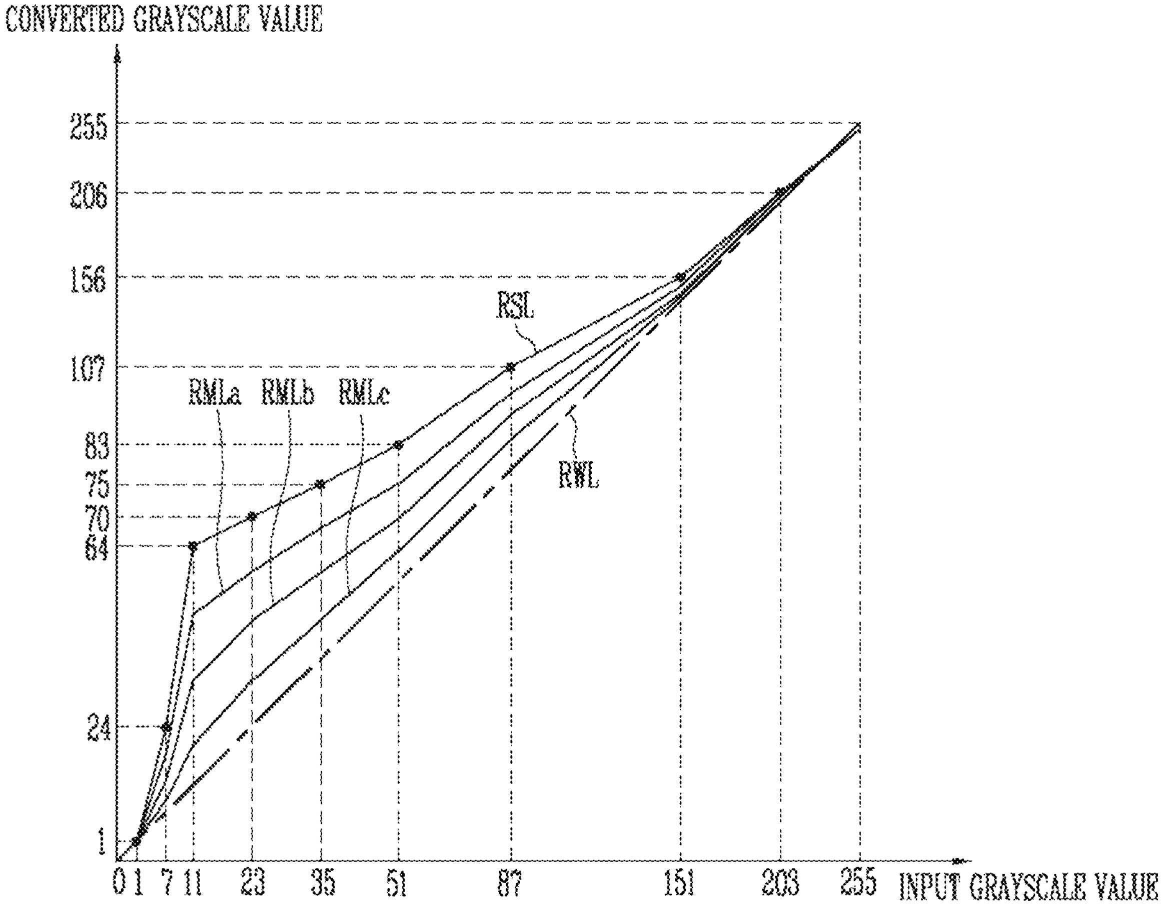

Referring to FIG. 25 in advance, the observation target grayscale values of the observation target pixels GP33, GP35, and GP53 in the unit area ORA1 may exceed the reference value. In addition, the observation target grayscale value of the observation target pixel GP55 may be a grayscale level that is equal to or less than the grayscale level 0 or the reference value. Accordingly, the observation target pixels GP33, GP35, and GP53 may be determined that they are in the emission state, and the observation target pixel GP55 may be determined that it is in the non-emission state. Therefore, the light emitting pixel counter 164 may determine the number of light emitting pixels with respect to the target pixel RP44 as 3.

Referring to FIG. 9, the observation target grayscale values of the observation target pixels GP33, GP35, GP53, and GP55 in the unit area ORA1 may exceed the reference value. Accordingly, the observation target pixels GP33, GP35, GP53, and GP55 may be determined that they are in the emission state. Therefore, the light emitting pixel counter 164 may determine the number of light emitting pixels with respect to the target pixel RP44 as 4.

The target pixels GP33 and BP24 and the unit areas OGA1 and OBA1 of FIGS. 12 and 13 may be similarly described, and therefore, overlapping descriptions may be omitted.

The grayscale converter 165 may provide a converted grayscale value by converting an input grayscale value, based on the number of light emitting pixels. For example, the grayscale converter 165 may generate the converted grayscale values PX1G', PX2G', . . . by adding, to the input grayscale values PX1G, PX2G, . . . , a corresponding offset value from among single color offset values RSO0 to RSO255, GSO0 to GSO255, and BSO0 to BS0255 and mixed color offset values RMOa0 to RMOa255, RMOb0 to RMOb255, RMOc0 to RMOc255, GMOa0 to GMOa255, GMOb0 to GMOb255, GMOc0 to GMOc255, BMOaO to BMOa255, BMObO to BMOb255, and BMOcO to BMOc255, based on the numbers PX1N, PX2N, . . . of light emitting pixels with respect to the target pixels.

The first single color offset provider 1611 may provide first single color offset values RSO0 to RSO255. The first single color offset values RSO0 to RSO255 may be single color offset values with respect to the first color, and be changed depending on the input maximum luminance value DBVI.

The second single color offset provider 1621 may provide second single color offset values GSO0 to GSO255. The second single color offset values GSO0 to GSO255 may be single color offset values with respect to the second color, and be changed depending on the input maximum luminance value DBVI.

The third single color offset provider 1631 may provide third single color offset values BSO0 to BS0255. The third single color offset values BSO0 to BS0255 may be single color offset values with respect to the third color, and be changed depending on the input maximum luminance value DBVI.

When the number of light emitting pixels is 0, the grayscale converter 165 may generate a converted grayscale value by adding a corresponding offset value from among the single color offset values RSO0 to RSO255, GSO0 to GSO255, and BSO0 to BS0255 to the input grayscale value.

For example, in FIG. 11, the number of light emitting pixels with respect to the target pixel RP44 is 0, and hence the grayscale converter 165 may generate a converted grayscale value with respect to the target pixel RP44 by adding a corresponding offset value from among the first single color offset values RSO0 to RS0255 to the input grayscale value of the target pixel RP44.

For example, in FIG. 12, the number of light emitting pixels with respect to the target pixel GP33 is 0, and hence the grayscale converter 165 may generate a converted grayscale value with respect to the target pixel GP33 by adding a corresponding offset value from among the second single color offset values GSO0 to GSO255 to the input grayscale value of the target pixel GP33.

For example, in FIG. 13, the number of light emitting pixels with respect to the target pixel BP24 is 0, and hence the grayscale converter 165 may generate a converted grayscale value with respect to the target pixel BP24 by adding a corresponding offset value from among the second single color offset values BSO0 to BS0255 to the input grayscale value of the target pixel BP24.

Returning now to FIG. 15, the first mixed color offset provider 1612 may provide first mixed color offset values RMOa0 to RMOa255, RMOb0 to RMOb255, and RMOc0 to RMOc255. The first mixed color offset values RMOa0 to RMOc255 may be mixed color offset values with respect to the first color.

The second mixed color offset provider 1622 may provide second mixed color offset values GMOa0 to GMOa255, GMOb0 to GMOb255, and GMOc0 to GMOc255. The second mixed color offset values GMOa0 to GMOc255 may be mixed color offset values with respect to the second color.

The third mixed color offset provider 1632 may provide third mixed color offset values BMOaO to BMOa255, BMObO to BMOb255, and BMOcO to BMOc255.

The third mixed color offset values BMOaO to BMOc255 may be mixed color offset values with respect to the third color.

When the number of light emitting pixels is greater than 0 and is less than the number of observation target pixels, the grayscale converter 165 may generate a converted grayscale value by adding a corresponding offset value from among the mixed color offset values RMOa0 to BMOc255 to the input grayscale value.

For example, in FIG. 23, the number of light emitting pixels with respect to the target pixel RP44 is 1, and hence the grayscale converter 165 may generate a converted grayscale value with respect to the target pixel RP44 by adding a corresponding offset value from among the first mixed color offset values RMOa0 to RMOa255 to the input grayscale value of the target pixel RP44.

For example, in FIG. 24, the number of light emitting pixels with respect to the target pixel RP44 is 2, and hence the grayscale converter 165 may generate a converted grayscale value with respect to the target pixel RP44 by adding a corresponding offset value from among the first mixed color offset values RMOb0 to RMOb255 to the input grayscale value of the target pixel RP44.

For example, in FIG. 25, the number of light emitting pixels with respect to the target pixel RP44 is 3, and hence the grayscale converter 165 may generate a converted grayscale value with respect to the target pixel RP44 by adding a corresponding offset value from among the first mixed color offset values RMOc0 to RMOc255 to the input grayscale value of the target pixel RP44.

The aforementioned description may be substantially identically applied even when the grayscale converter 165 uses the second and third mixed color offset values GMOa0 to BMOc255, and therefore, overlapping descriptions may be omitted.

When the number of light emitting pixels is equal to the number of observation target pixels, the grayscale converter 165 may determine an input grayscale value as the converted grayscale value.

For example, referring to FIG. 9, the number of observation target pixels GP33, GP35, GP53, and GP55 with respect to the target pixel RP44 is 4, and the number of light emitting pixels is also 4. Hence, an offset value may not be added to the input grayscale value of the target pixel RP44. In other words, an offset value 0 may be added to the input grayscale value of the target pixel RP44. That is, the input grayscale value of the target pixel RP44 and the converted grayscale value may be equal to each other.

Substantially identical description may be applied to the target pixels of the second color and the second color, and therefore, overlapping descriptions may be omitted.

Figure 16:
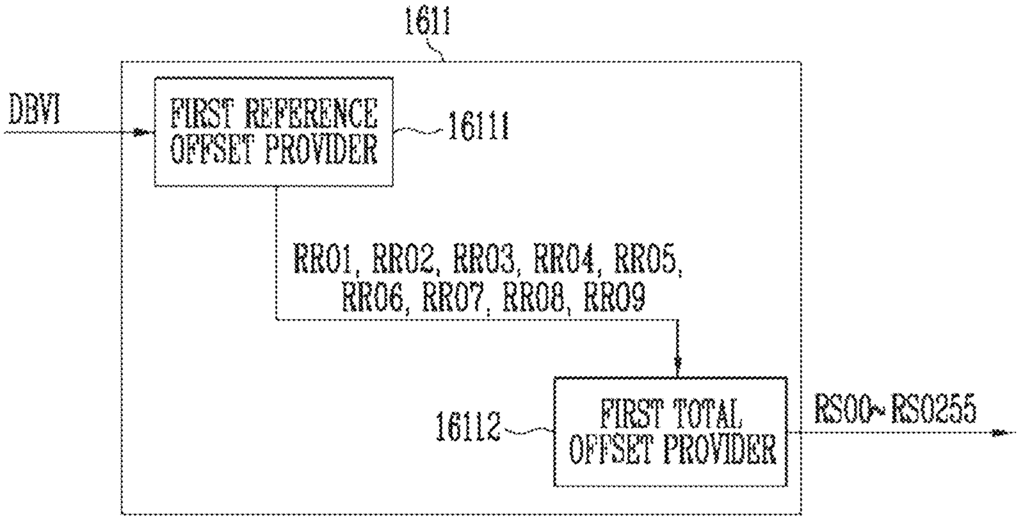
FIGS. 16-18 are diagrams illustrating a single color offset provider of FIG. 15.
Figure 17:
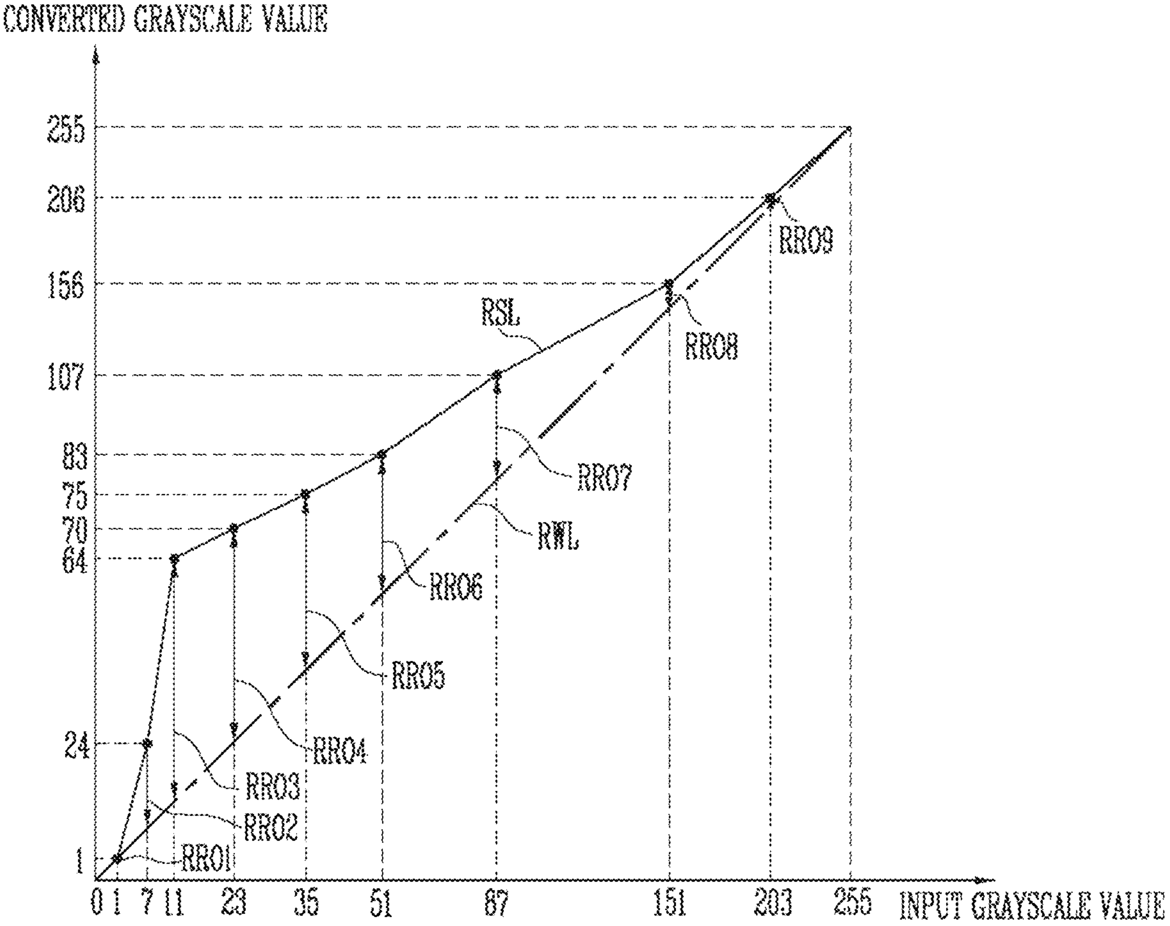
Figure 18:
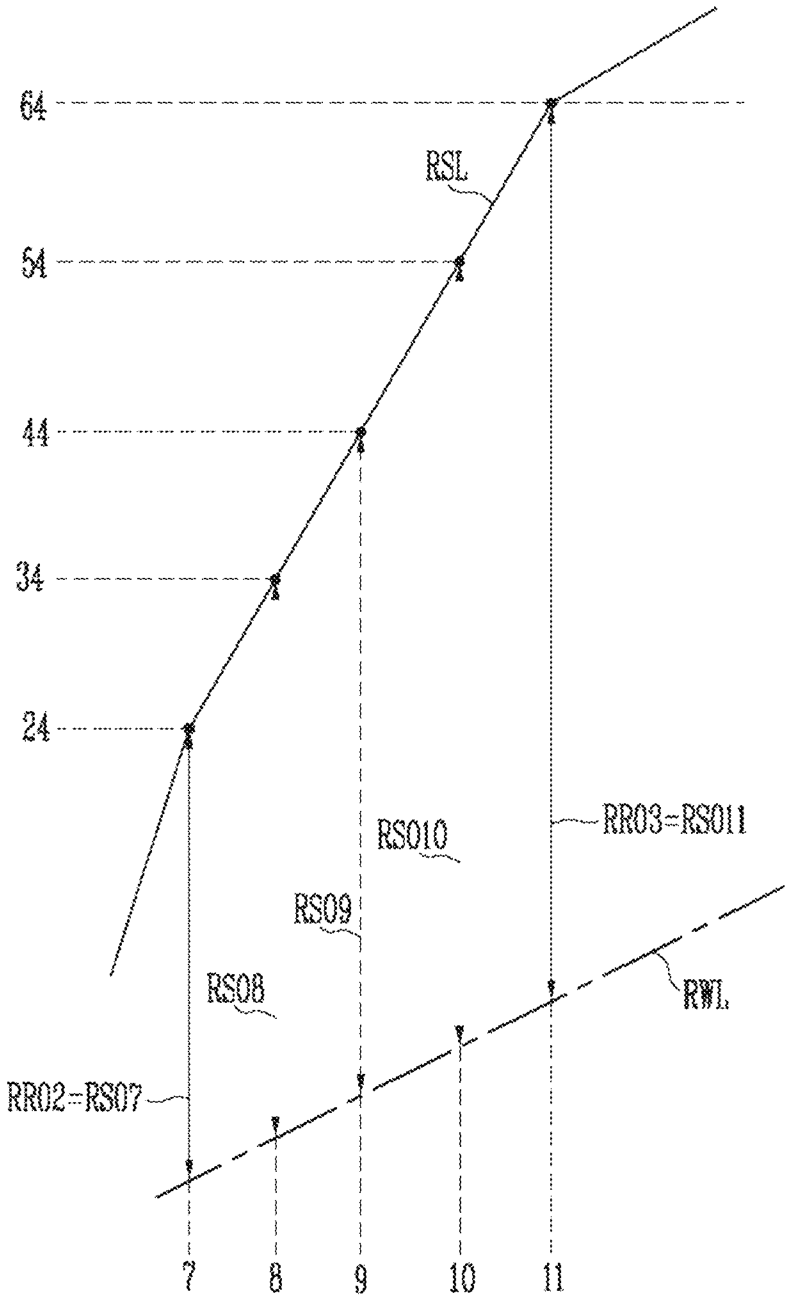

FIGS. 16-18 are diagrams illustrating the single color offset provider of FIG. 15.

In some embodiments, the first single color offset provider 1611 may include a first reference offset provider 16111 and a first total offset provider 16112. Substantially identical description may be applied to the second and third single color offset providers 1621 and 1631, and therefore, overlapping descriptions may be omitted.

The first reference offset provider 16111 may receive the input maximum luminance value DBVI, and provide first reference offset values RRO1, RRO2, RRO3, RRO4, RRO5, RRO6, RRO7, RRO8, and RRO9 corresponding to the input maximum luminance value DBVI.

When the number of light emitting pixels is equal to the number of observation target pixels, a converted grayscale value equal to the input grayscale value may be output by the grayscale converter 165 as described above. The relationship of converted grayscale values with respect to input grayscale values may follow a white color grayscale line RWL.

When the number of light emitting pixels is 0, a converted grayscale value different from the input grayscale value may be output by the grayscale converter 165 as described above. That is, the converted grayscale value may be generated by adding a corresponding offset value corresponding to the first single color offset values RSO0 to RSO255 to the input grayscale value. The relationship of converted grayscale values with respect to input grayscale values may follow a first single color grayscale line RSL.

For example, when the input grayscale value is 1, a first single color offset value RSO1 that is 0 may be added such that the converted grayscale value becomes 1. Also, when the input grayscale value is 7, a first single color offset value RSO7 that is 17 is added such that the converted grayscale value becomes 24. Also, when the input grayscale value is 11, a first single color offset value RSO11 that is 53 is added such that the converted grayscale value becomes 64. Also, when the input grayscale value is 23, a first single color offset value RSO23 that is 47 is added such that the converted grayscale value becomes 70. Also, when the input grayscale value is 35, a first single color offset value RSO35 that is 40 is added such that the converted grayscale value becomes 76. Also, when the input grayscale value is 51, a first single color offset value RSO51 that is 32 is added such that the converted grayscale value becomes 83. Also, when the input grayscale value is 87, a first single color offset value RSO87 that is 20 is added such that the converted grayscale value becomes 107. Also, when the input grayscale value is 151, a first single color offset value RSO151 that is 5 is added such that the converted grayscale value becomes 156. Also, when the input grayscale value is 203, a first single color offset value RSO203 that is 3 is added such that the converted grayscale value becomes 206. When the input grayscale value is 255, the converted grayscale value may be 255. When the input grayscale value is 0, the converted grayscale value may be 0.

The first single color offset values RSO1, RSO7, RSO11, RSO23, RSO35, RSO51, RSO87, RSO151, and RSO203 may correspond to the first reference offset values RRO1, RRO2, RRO3, RRO4, RRO5, RRO6, RRO7, RRO8, and RRO9.

The first total offset generator 16112 may generate first single color offset values RSO0 to RSO255 by interpolating the first reference offset values RRO1 to RRO9. The existing methods such as linear interpolation, polynomial interpolation, and exponential interpolation may be used as the interpolation method. Hereinafter, description of the interpolation method will be omitted.

For example, referring to FIG. 18, the first total offset generator 16112 may generate a first single color offset value RSO8 corresponding to the grayscale value 8, a first single color offset value RSO9 corresponding to the grayscale value 9, and a first single color offset value RSO10 corresponding to the grayscale value 10 by interpolating a first reference offset value RRO2 corresponding to the grayscale 7 and a first reference offset value RRO3 corresponding to the grayscale value 11.

Thus, according to this embodiment, it is unnecessary to store all the first offset values RSO0 to RSO255 in advance, so that cost for a memory device can be reduced.

Figure 19:
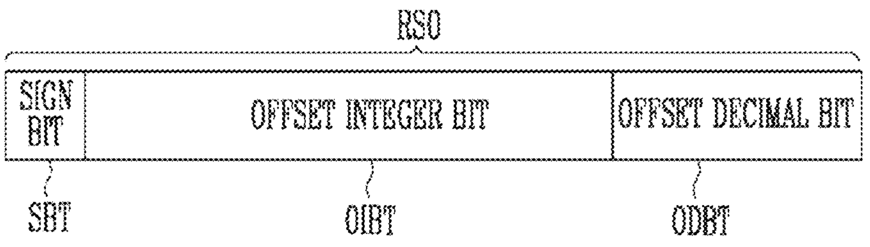
FIG. 19 is a diagram illustrating a configuration of an exemplary offset value.

FIG. 19 is a diagram illustrating a configuration of an exemplary offset value.

Referring to FIG. 19, the offset value RSO may include a sign bit SBT, an offset integer bit OIBT, and an offset decimal bit ODBT.

The sign bit SBT may express whether the offset value RSO is a positive number or a negative number. For example, referring to FIG. 14, it is necessary to decrease gamma values of the first single color light curve RWC and the second single color light curve GWC, and therefore, the offset value RSO may be a positive number. However, it is necessary to increase a gamma value of the third single color light curve BWC, and therefore, the offset value RSO may be a negative number. For example, the offset value RSO may be a positive number when the sign bit SBT is 0, and be a negative number when the sign bit SBT is 1. On the contrary, the offset value RSO may be a positive number when the sign bit SBT is 1, and be a negative number when the sign bit SBT is 0.

In the case of FIG. 18, the interpolated converted grayscale values 24, 44, 54, and 64 may be expressed with only integers. However, in some cases, the interpolated converted grayscale values may be expressed with integers and decimals (e.g., real numbers). For example, referring to FIG. 17, 63 input grayscale values corresponding to between 87 and 151 may be corrected to converted grayscale values between 107 and 156. Because the number of integers between 107 and 156 is 48, it is necessary to express a minimal of 15 converted grayscale values with integers and decimals. Therefore, the offset value RSO requires the offset integer bit OIBT and the offset decimal bit ODBT.

When the offset value RSO has a decimal value, the corrected converted grayscale value cannot express a corresponding luminance with only one of the grayscale voltages RV0 to RV255 (see FIG. 8). The display device 10 can express a luminance corresponding to a converted grayscale value having a decimal value by spatially dithering a target pixel and adjacent pixels.

Figure 20:
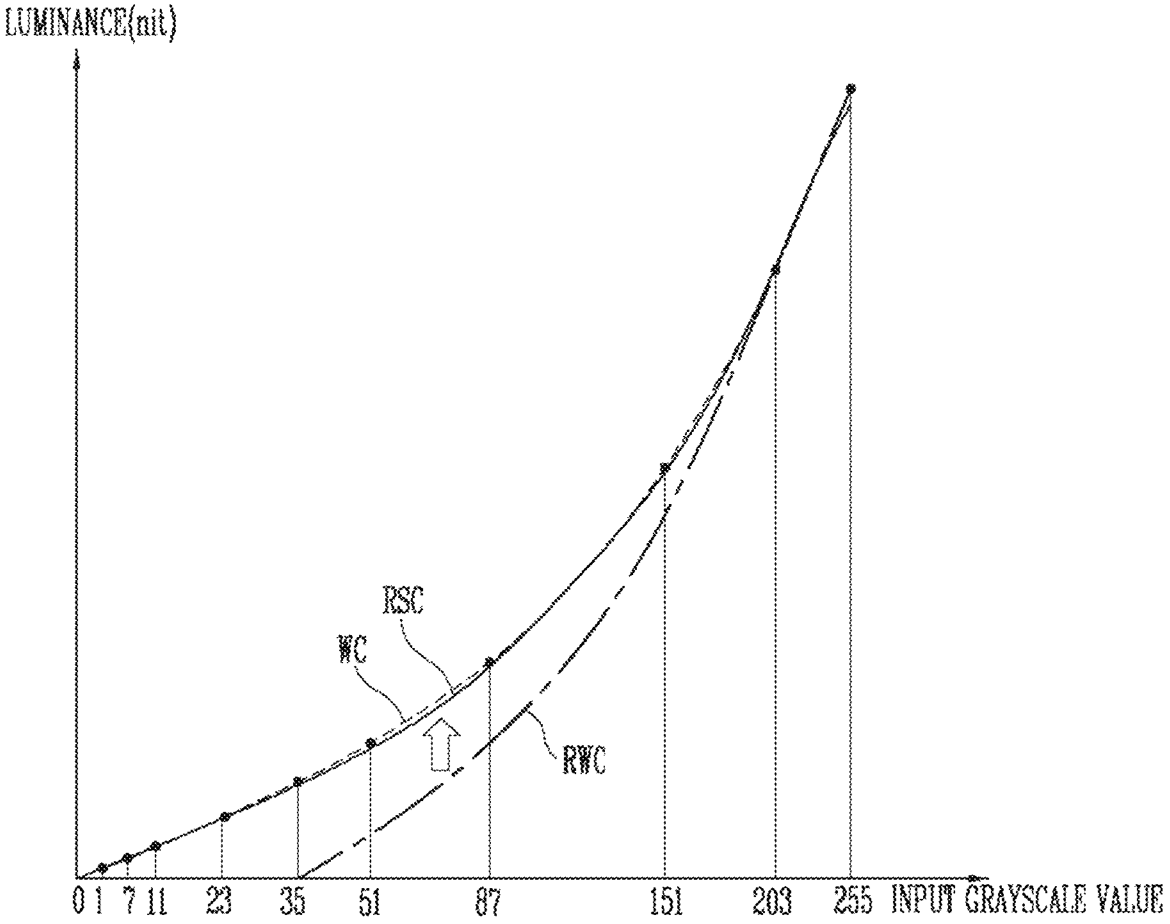
FIG. 20 is a diagram illustrating an effect obtained by applying a single offset value.

FIG. 20 is a diagram illustrating an effect obtained by applying a single offset value.

A first single color light curve RWC represents luminance in a case where the pixels 14 emit light of a first single color due to input grayscale values that are not corrected.

A first single color light correction curve RSC represents luminance in a case where the pixels 14 emit light of the first single color due to corrected input grayscale values, i.e., converted grayscale values.

For example, the display device 10 according to the embodiment of the present disclosure may include a first pixel emitting light of a first color, a second pixel emitting light of a second color different from the first color, a third pixel emitting light of a third color different from the first color and the second color, and a grayscale corrector 16 for converting input grayscale values provided corresponding to the first to third pixels into converted grayscale values. The first to third pixels may emit light, based on the converted grayscale values.

A first luminance of the first pixel in a first case where the first pixel, the second pixel, and the third pixel emit lights may be different from a second luminance of the first pixel in a second case where only the first pixel emits light and the second and third pixels do not emit lights.

An input grayscale value provided corresponding to the first pixel in the first case may be equal to that provided corresponding to the first pixel in the second case, and a converted grayscale value corresponding to the first luminance may be different from that corresponding to the second luminance.

That is, as for the same input grayscale values, the first luminance in the first case may follow the first single color light curve RWC, and the second luminance in the second case may follow the first single color light correction curve RSC.

A gamma value of the first single color light correction curve RSC may be less than that of the first single color light curve RWC. Accordingly, the luminance of first single color light can be accurately expressed according to a desired gamma curve. Further, low-grayscale expression can be clearer.

A substantially identical embodiment may be applied to a second single color light and a third single color light, and therefore, overlapping description may be omitted.

Figure 21:
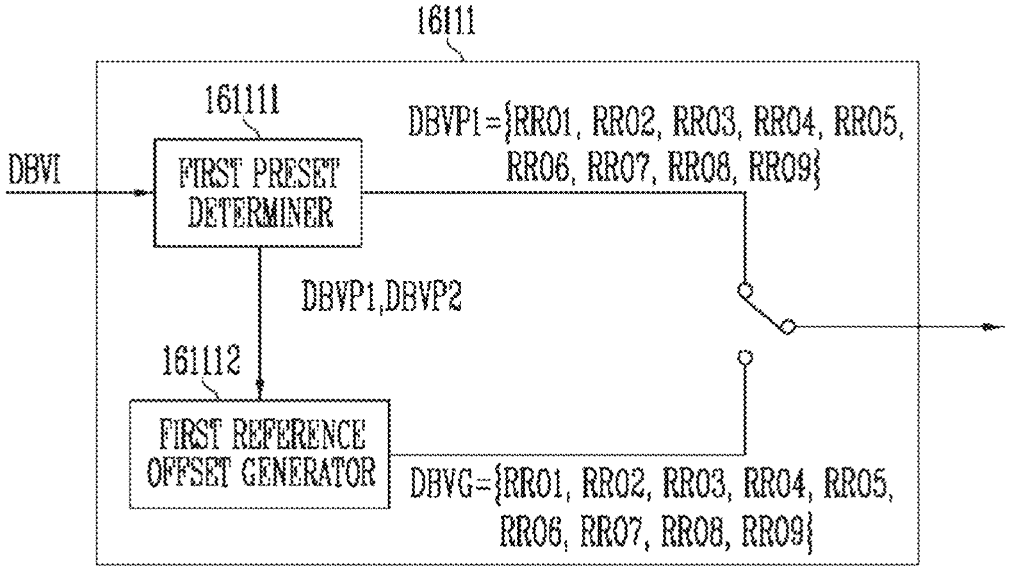
FIGS. 21-22 are diagrams illustrating a reference offset provider of FIG. 16.
Figure 22:
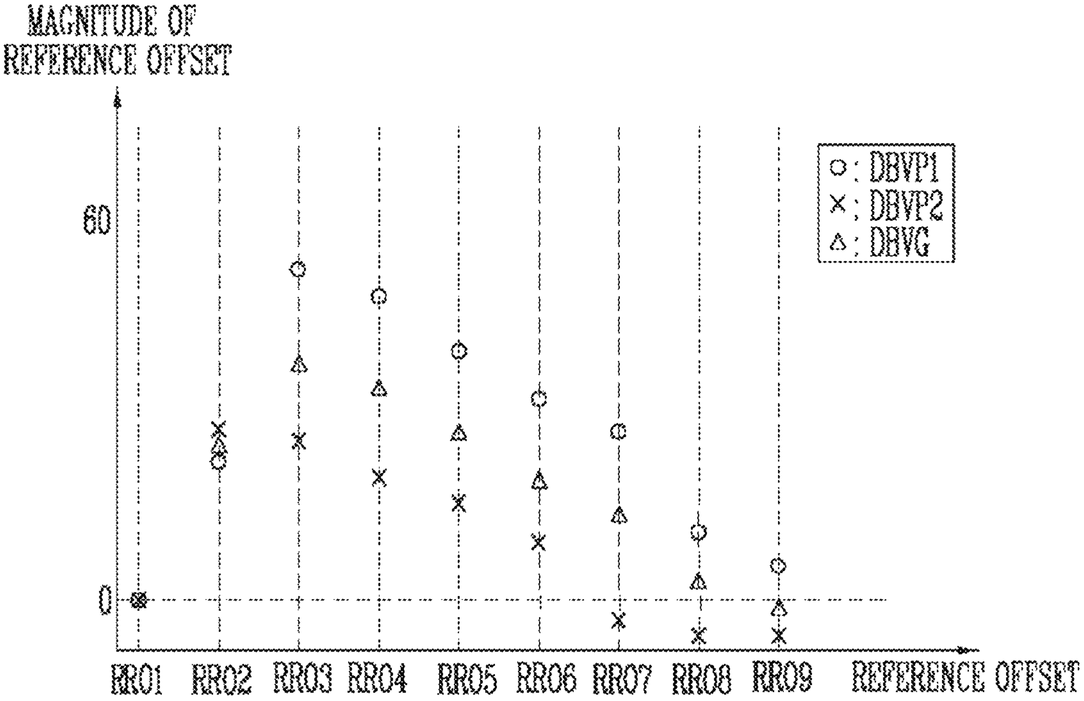

FIGS. 21-22 are diagrams illustrating the reference offset provider of FIG. 16.

In some embodiments, the first reference offset provider 16111 may include a first preset determiner 161111 and a first reference offset generator 161112.

The first preset determiner 161111 may store, in advance, first preset offset values corresponding to preset maximum luminance values, and determine whether an input maximum luminance value DBVI corresponds to any one of the preset maximum luminance values.

For example, the preset maximum luminance values may include a maximum value (e.g., 1200 nit) and a minimum value (e.g., 4 nit) of a receivable input maximum luminance value DBVI.

Also, the preset maximum luminance values may further include a first intermediate maximum luminance value (e.g., 100 nit). When the input maximum luminance value is a value between the maximum value and the first intermediate maximum luminance value, a grayscale voltage corresponding to a converted grayscale value is adjusted corresponding to the input maximum luminance value DBVI, so that the luminance of a target pixel may be controlled. For example, the luminance of the target pixel in a section between 1200 nit and 100 nit may rely on a grayscale voltage control method. In addition, when the input maximum luminance value DBVI is a value between the minimum value and the first intermediate maximum luminance value, the emission period of the target pixel is adjusted corresponding to the input maximum luminance value DBVI, so that the luminance of the target pixel can be controlled. For example, the luminance of the target pixel in a section between 100 nit and 4 nit may rely on a duty ratio control method.

Also, the preset maximum luminance values may further include a second intermediate maximum luminance value (e.g., 30 nit) that is a value between the first intermediate maximum luminance value and the minimum value.

The above-described four preset maximum luminance values (i.e., 1200 nit, 100 nit, 30 nit, and 4 nit) are merely illustrative, and other preset maximum luminance values may be set depending on products.

When the input maximum luminance value DBVI corresponds to any one of the preset maximum luminance values, the first preset determiner 161111 may provide corresponding first preset offset values DBVP1 as the first reference offset values RRO1 to RRO9. For example, first preset offset values DBVP1 with respect to each of the 1200 nit, the 100 nit, the 30 nit, and the 4 nit may be stored in advance. Therefore, when the input maximum luminance value DBVI corresponds to one of the 1200 nit, the 100 nit, the 30 nit, and the 4 nit, the first reference offset values RRO1 to RRO9 may be provided without passing through the first reference offset generator 161112.

When the input maximum luminance value DBVI does not correspond to any one of the preset maximum luminance values, the first preset determiner 161111 may provide first preset offset values corresponding to at least two preset maximum luminance values.

For example, when the input maximum luminance value DBVI is 17 nit, the first preset determiner 161111 may provide first preset offset values DBVP1 corresponding to the 4 nit and first preset offset values DBVP2 corresponding to the 30 nit.

The first reference offset provider 161112 may generate the first reference offset values RRO1 to RRO9 by interpolating first preset offset values DBVP1 and DBVP2 corresponding to at least two preset maximum luminance values.

Referring to FIG. 22, a process of determining magnitudes of first reference offset values DBVG corresponding to 17 nit by interpolating first preset offset values DBVP1 corresponding to the 4 nit and first preset offset values DBVP2 corresponding to the 30 nit is expressed using a graph.

Thus, according to this embodiment, it is unnecessary to store offset values in advance with respect to all receivable input maximum luminance values DBVI, so that cost of a memory device, etc. can be reduced.

FIGS. 23-27 are diagrams illustrating the mixed color offset provider of FIG. 15.

Hereinafter, the first mixed color offset provider 1612 with respect to the first color is described as an example, and descriptions overlapping with those of the second mixed color offset provider 1622 and the third mixed color offset provider 1632 to which substantially identical contents may be applied may be omitted.

As described above, FIG. 23 illustrates a case where the number of light emitting pixels in the unit area ORA1 is 1. The grayscale converter 165 may use first mixed color offset values RMOa0 to RMOa255 corresponding to a first mixed color grayscale line RMLa.

In addition, FIG. 24 illustrates a case where the number of light emitting pixels in the unit area ORA1 is 2. The grayscale converter 165 may use first mixed color offset values RMOb0 to RMOb255 corresponding to a first mixed color grayscale line RMLb.

In addition, FIG. 25 illustrates a case where the number of light emitting pixels in the unit area ORA1 is 3. The grayscale converter 165 may use first mixed color offset values RMOc0 to RMOc255 corresponding to a first mixed color grayscale line RMLc.

The first mixed color offset provider 1612 may generate the first mixed color offset values RMOa0 to RMOc255 by interpolating the first single color offset values RSO0 to RSO255 provided thereto. In another embodiment, the first mixed color offset provider 1612 may autonomously generate the first mixed color offset values RMOa0 to RMOc255 or store the first mixed color offset values RMOa0 to RMOc255 in advance, independently from the first single color offset provider 1611.

Figure 27:
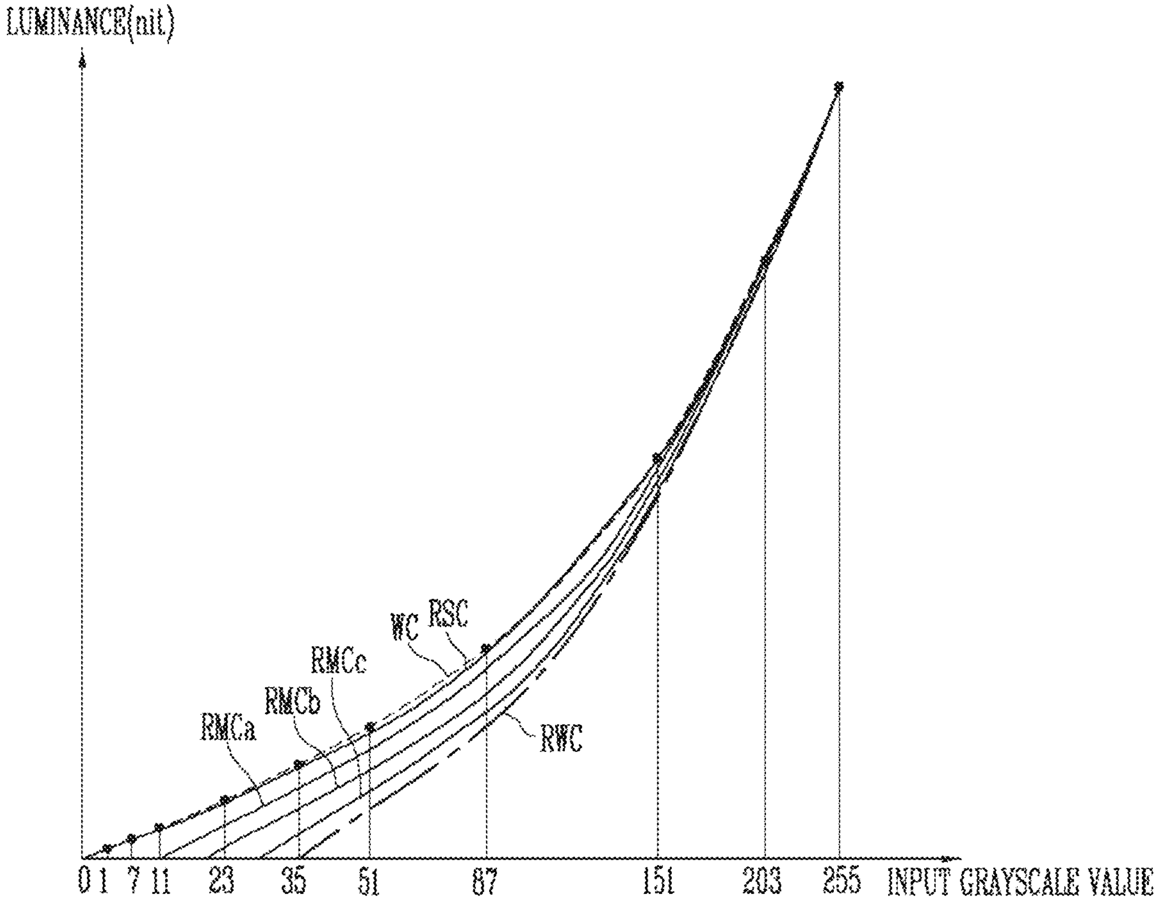

Referring to FIG. 27, there are illustrated a first mixed color light curve RMCa corresponding to the first mixed color grayscale line RMLa, a second mixed color light curve RMCb corresponding to the first mixed color grayscale line RMLb, and a third mixed color light curve RMCc corresponding to the first mixed color grayscale line RMLc.

Therefore, the first mixed color light curve may be similar to the first single color light correction curve RSC when the number of light emitting pixels decreases, and be similar to the first single color light curve RWC when the number of light emitting pixels increases.

FIGS. 28-31 are diagrams illustrating a tuning process performed by considering a mixed color light.

In this embodiment, a case where the first color is red, the second color is green, and the third color is blue is assumed. The red, green, and blue may be expressed as primary colors. Magenta corresponding to a secondary color may be expressed with a combination of red and blue. Cyan corresponding to a secondary color may be expressed with a combination of green and blue. Yellow corresponding to a secondary color may be expressed with a combination of red and green.

Figure 28:
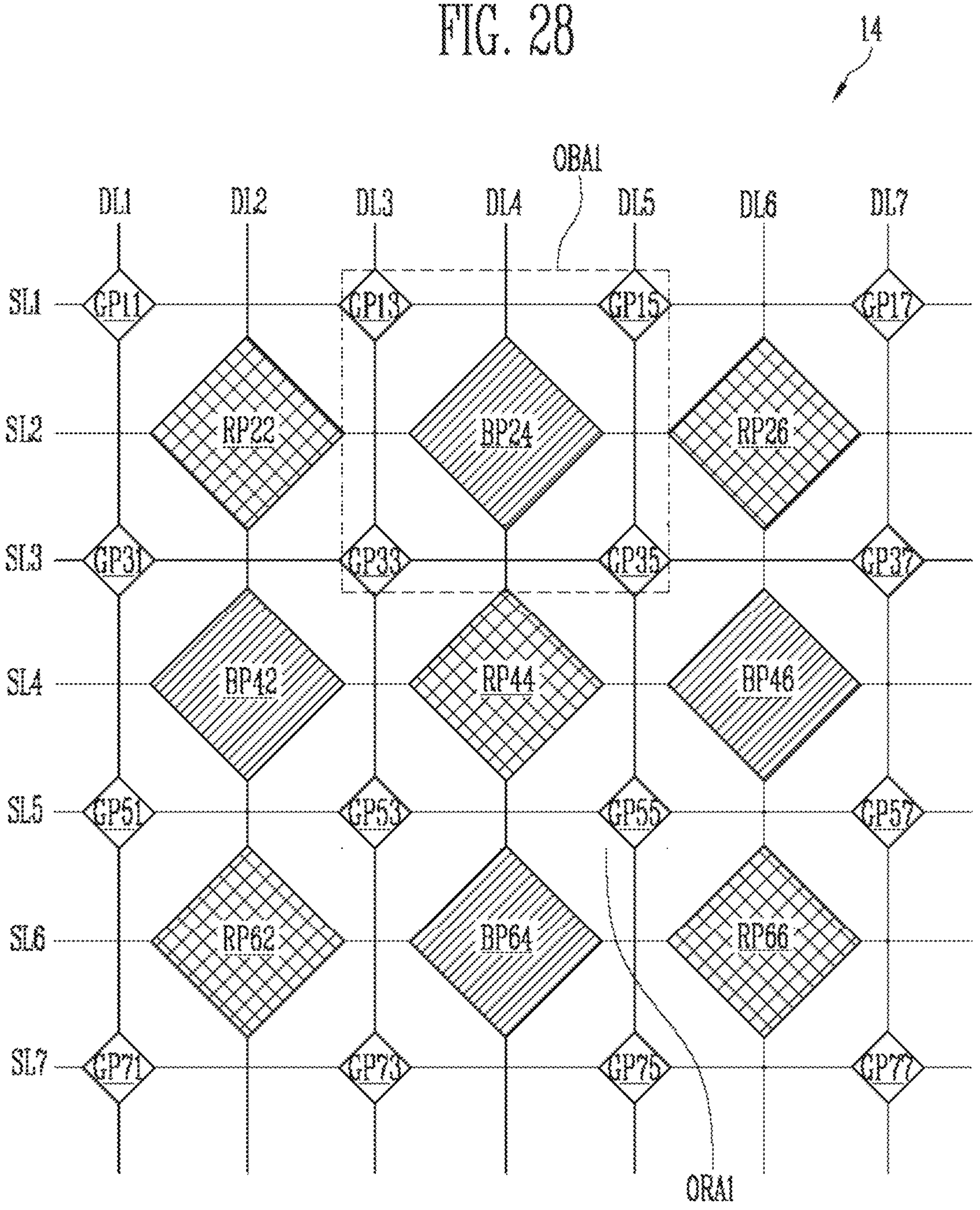
FIGS. 28-31 are diagrams illustrating a tuning process performed by considering a mixed color light.

Referring to FIG. 28, because the red pixels RP22 to RP66 and the blue pixels BP24 to BP64 are in the emission state, and the green pixels GP11 to GP77 are in the non-emission state, the pixels 14 display an image frame of a magenta color. In FIGS. 28-31, magenta is described as an example. A similar tuning method may be applied to cyan and yellow, and therefore, overlapping descriptions may be omitted.

According to the above-described embodiments, because the number of light emitting pixels in the unit area ORA1 is 0, one of the first single color light offset values RSO0 to RSO255 may be applied to a target pixel RP44. In addition, because the number of light emitting pixels in the unit area OBA1 is 0, one of the third single color light offset values BSO0 to BS0255 may be applied to a target pixel BP24.

Figure 29:
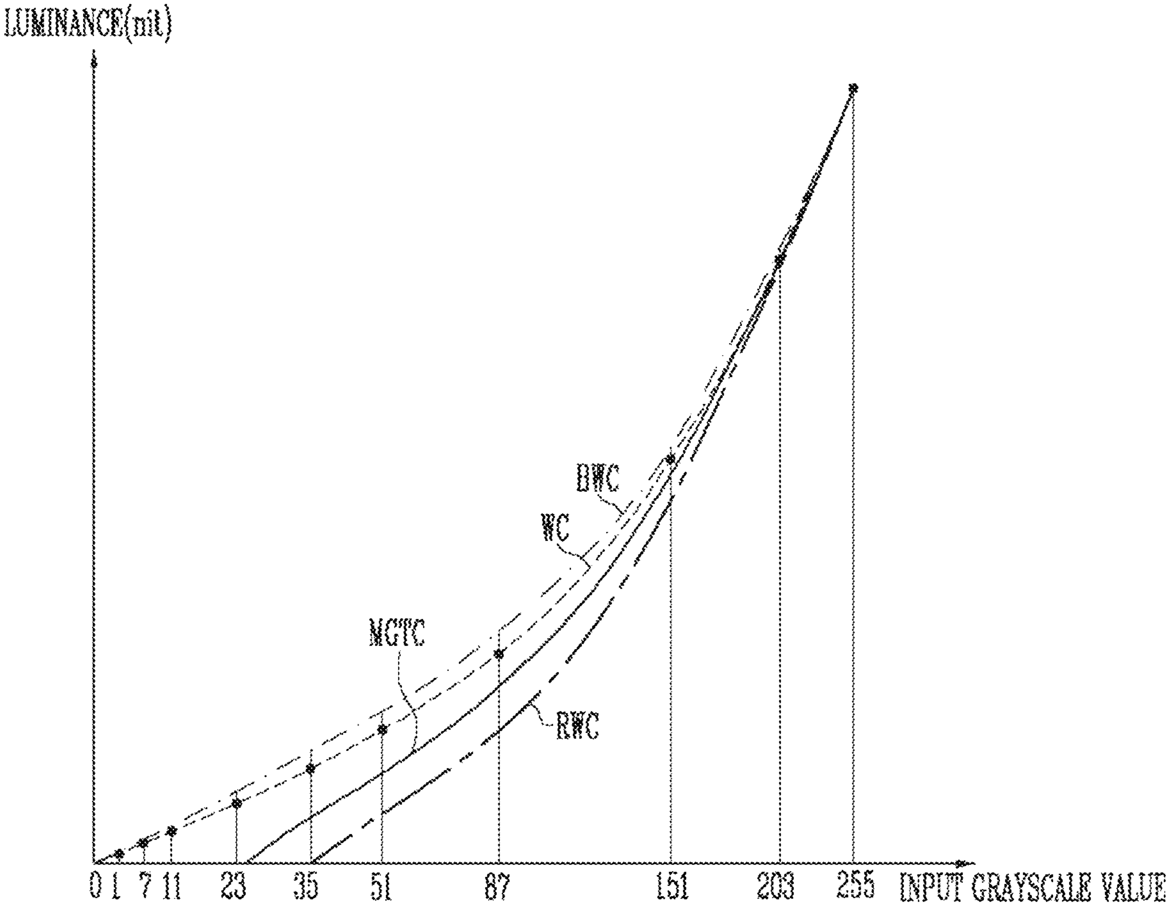
Figure 30:
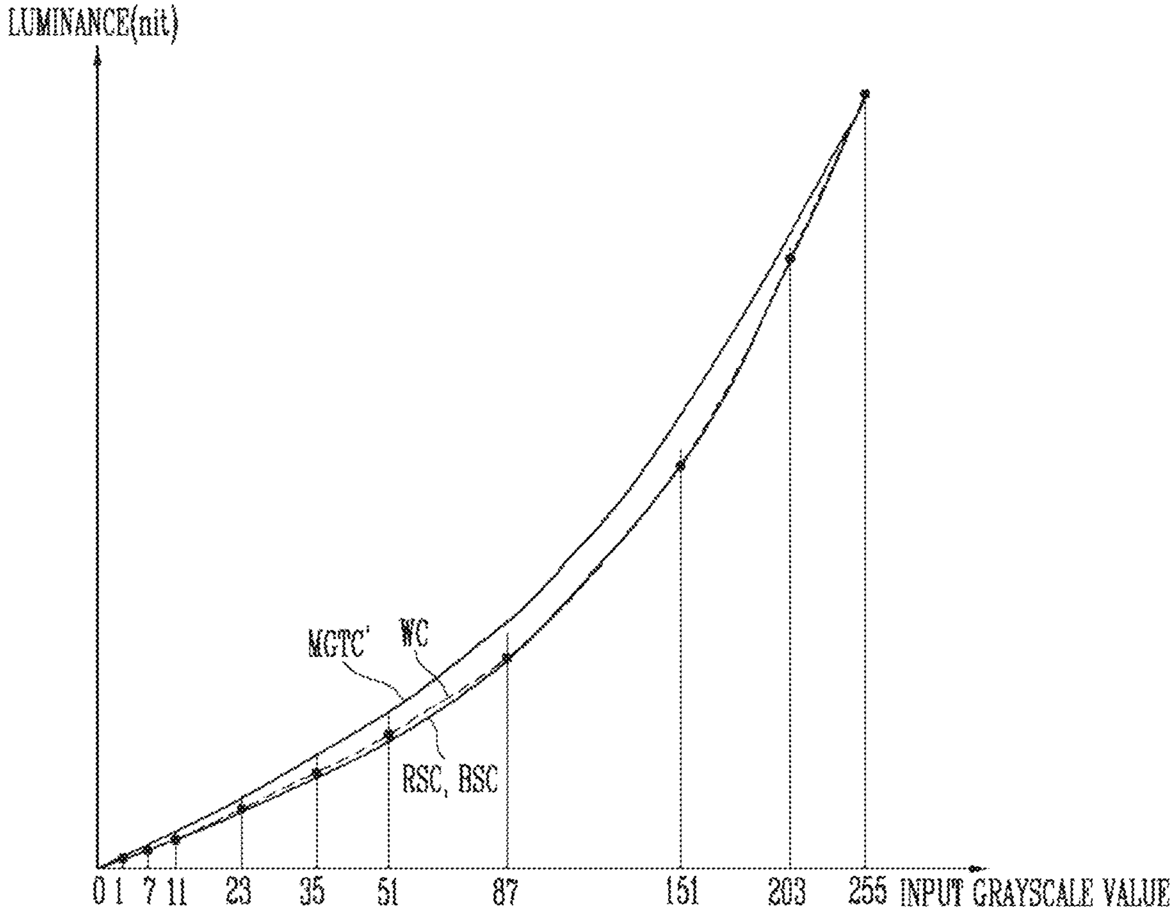

Therefore, referring to FIGS. 29 and 30, the first single color light curve RWC may be corrected to a first single color light correction curve RSC of which gamma value is substantially equal to that of the white color light curve WC, and the third single color light curve BWC may be corrected to a third single color light correction curve BSC of which gamma value is substantially equal to that of the white color light curve WC. However, due to this, a magenta color light curve MGTC may be unintentionally over-corrected to a curve MGTC'.

Figure 31:
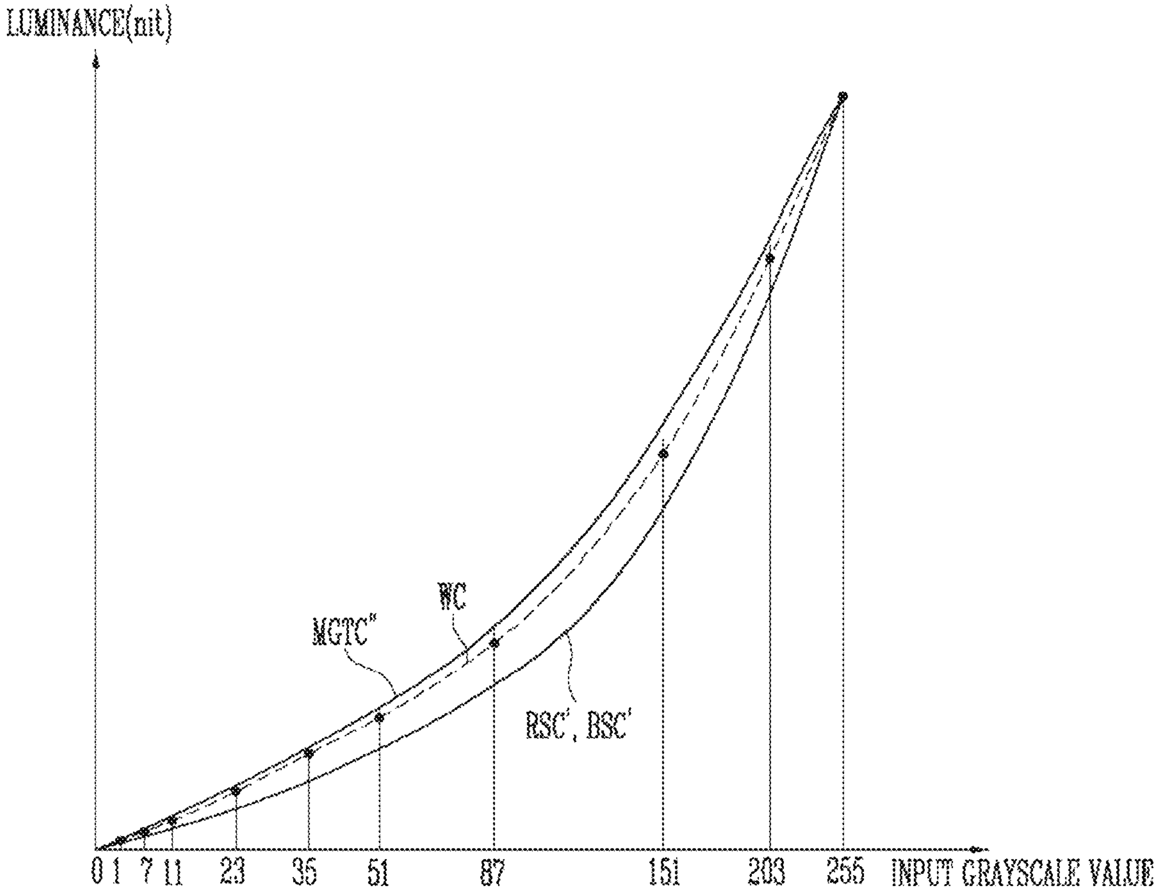

Therefore, according to this embodiment, gamma values of a first single color light correction curve RSC' and a third single color light correction curve BSC' are corrected greater than the gamma value of the white color light curve WC, so that a magenta color light correction curve MGTC" of which gamma value is more similar than that of the white color light curve WC may be generated. For example, as can be seen in FIG. 31, when each of the gamma values of the first single color light correction curve RSC' and the third single color light correction curve BSC' is adjusted to 2.4, the magenta color light correction curve MGTC" having a gamma value of 2.1 may be generated.

Thus, the first to third single color offset values RSO0 to RSO255, GSO0 to GSO255, and BSO0 to BS0255 can be adjusted suitable for a color sensitive to eyes of a user according to products.

Figure 32:
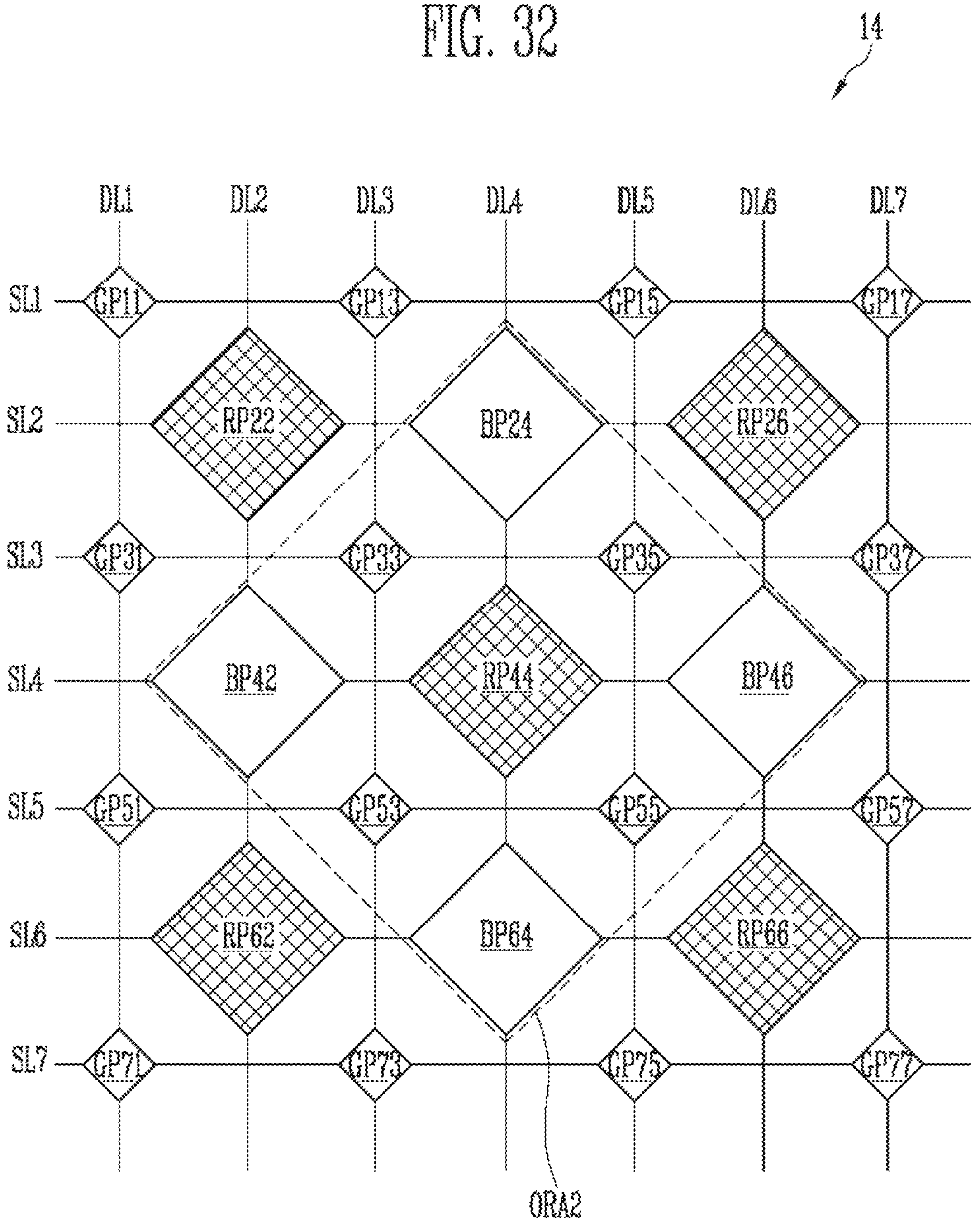
FIGS. 32-34 are diagrams illustrating a case where the range of observation target pixels is differently set.
Figure 33:
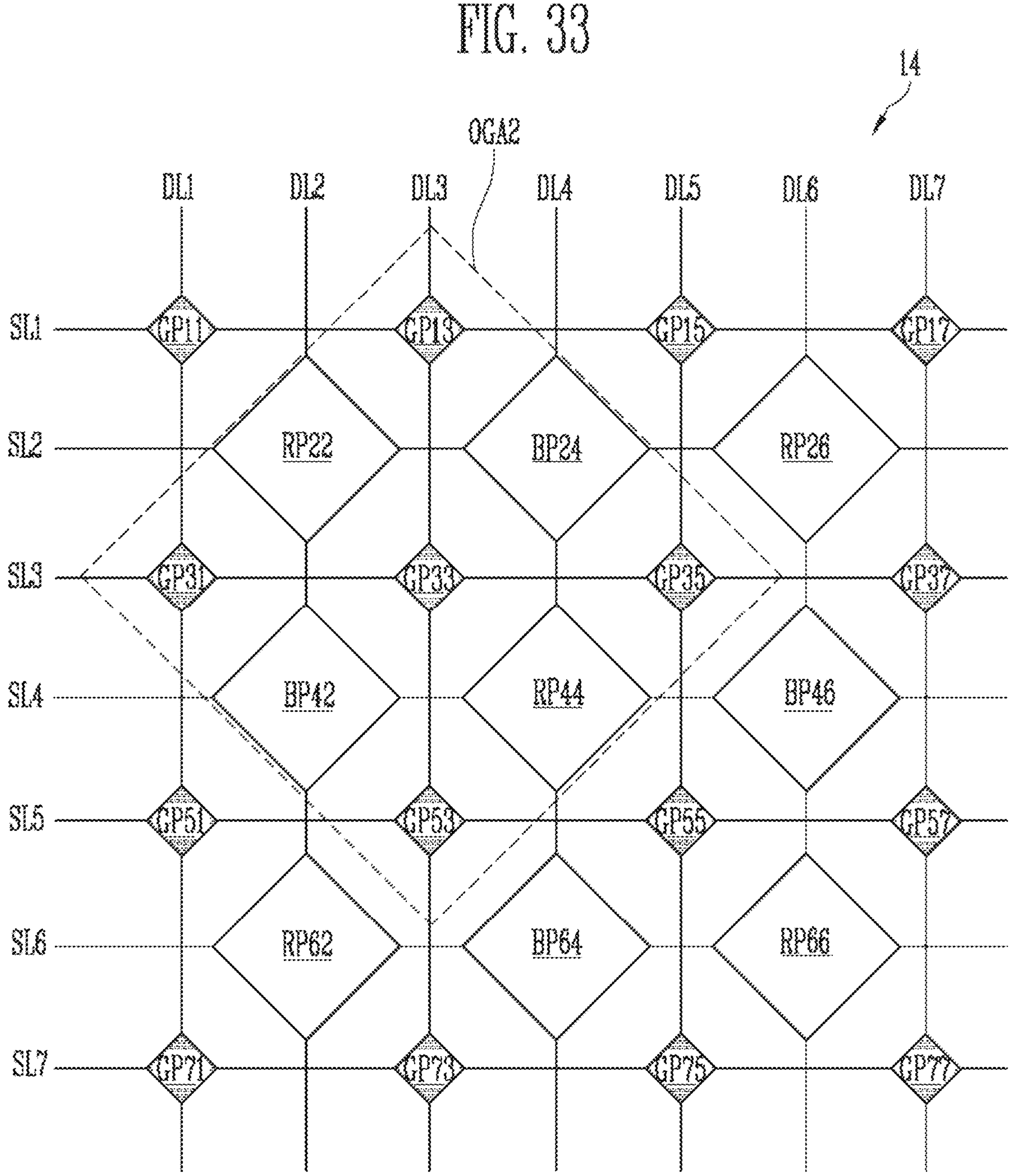
Figure 34:
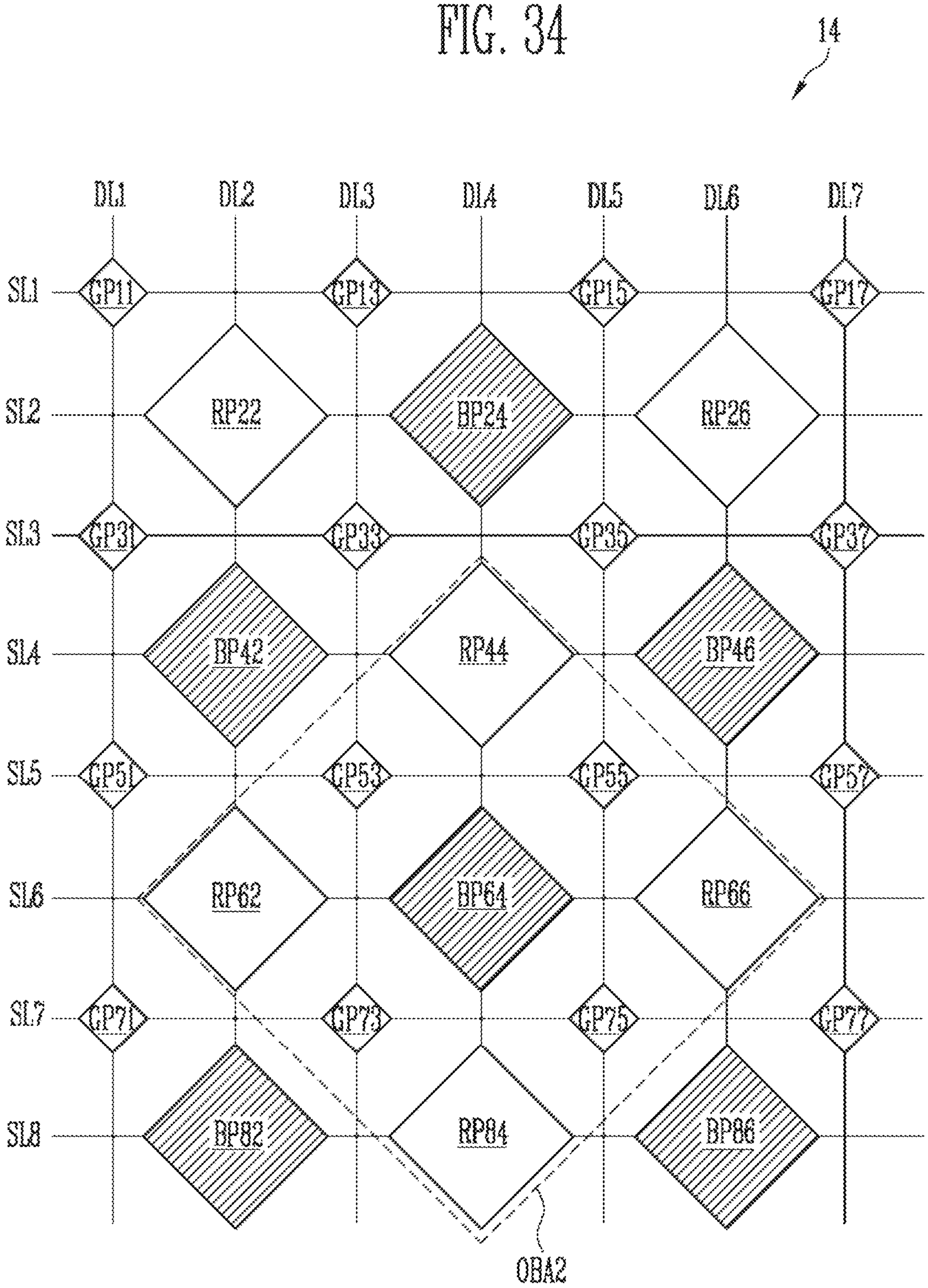

FIGS. 32-34 are diagrams illustrating a case where the range of observation target pixels is differently set.

In the embodiments described so far, a case where the number of observation target pixels is 4 in each of the unit areas ORA1, OGA1, and OBA1 has been described.

However, in this embodiment, it shows that the number of observation target pixels may be 8 by applying expanded unit areas ORA2, OGA2, and OBA2. Similarly, the unit areas may be set such that the number of observation target pixels exceeds 8.

In this embodiment, single color offset providers 1611, 1621, and 1631 and mixed color offset providers 1612, 1622, and 1632 may be configured substantially identical to those described in FIG. 15, and therefore, overlapping descriptions may be omitted.

As for a unit area ORA2 with respect to the first color and the unit area OBA2 with respect to the third color, a light emitting pixel counter 164 and a grayscale converter 165 may be configured substantially identical to those of FIG. 15, and therefore, overlapping descriptions may be omitted.

However, referring to a unit area OGA2 with respect to the second color, when the unit area OGA2 emits a second single color light, observation target pixels GP13, GP31, GP35, and GP53 of the second color are also in the emission state, and hence the light emitting pixel counter 164 and the grayscale converter 165 may be differently configured.

For example, when the number of light emitting pixels corresponding to the first color and the third color is 0, the grayscale converter 165 may generate a converted grayscale value by adding a corresponding offset value from among the second single color offset values GSO0 to GSO255 to an input grayscale value.

That is, in this embodiment, the light emitting pixel counter 164 may distinguish and count colors (e.g., the first color and the third color) different from at least the second color. In addition, the grayscale converter 165 may apply offset values, using the number of light emitting pixels, which is distinguished and counted for each color.

When the number of light emitting pixels corresponding to the first color and the third color is not 0 and is less than the number of observation target pixels corresponding to the first color and the second color, the grayscale converter 165 may generate a converted grayscale value by adding a corresponding offset value from among the second mixed color offset values GMOa0 to GMOa255, GMOb0 to GMOb255, and GMOc0 to GMOc255 to the input grayscale value.

When the number of light emitting pixels corresponding to the first color and the second color is equal to the number of observation target pixels corresponding to the first color and the second color, the grayscale converter 156 may determine the input grayscale value as the converted grayscale value.

Therefore, according to this embodiment, the number of observation target pixels may become 8 by applying the expanded unit areas ORA2, OGA2, and OBA2. Similarly, the unit areas may be set such that the number of observation target pixels exceeds 8.

According to the present disclosure, the display device can exhibit a desired luminance not only when a white color light is radiated but also when a single color light or a mixed color light is radiated.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the present disclosure as set forth in the following claims and their equivalents.

What is claimed is:

1. A display device comprising:

a first pixel having a first emission area; and second pixels located adjacent to the first pixel and having a second emission area smaller than the first emission area, wherein, when the first pixel and all of the second pixels emit light, the first pixel emits light of a first luminance in response to a first input grayscale value, and wherein, when the first pixel emits light but none of the second pixels emit light, the first pixel emits light of a second luminance higher than the first luminance in response to the first input grayscale value.

2. The display device of claim 1, wherein, when the first pixel emits light and only one of the second pixels emits light, the first pixel emits light of a third luminance between the first luminance and the second luminance in response to the first input grayscale value.

3. The display device of claim 2, wherein, when the first pixel emits light and only two of the second pixels emit light, the first pixel emits light of a fourth luminance between the first luminance and the third luminance in response to the first input grayscale value.

4. The display device of claim 3, wherein, when the first pixel emits light and only three of the second pixels emit light, the first pixel emits light of a fifth luminance between the first luminance and the fourth luminance in response to the first input grayscale value.

5. The display device of claim 4, wherein the first pixel emits light of a first color, and wherein the second pixels emit light of a second color different from the first color.

6. The display device of claim 5, wherein the first color is red.

7. The display device of claim 6, wherein the second color is green.

8. The display device of claim 1, wherein the first pixel is connected to a first data line different from second and third data lines to which the second pixels are connected.

9. The display device of claim 8, wherein the first pixel is connected to a first scan line different from second and third scan lines to which the second pixels are connected.

10. The display device of claim 9, wherein the first data line is located between the second and third data lines, and wherein the first scan line is located between the second and third scan lines.

11. A display device comprising:

a first pixel having a first emission area; and second pixels located adjacent to the first pixel and having a second emission area smaller than the first emission area, wherein, when the first pixel and all of the second pixels emit light, the first pixel emits light of a first luminance in response to a first input grayscale value, and wherein, when the first pixel emits light but none of the second pixels emit light, the first pixel emits light of a second luminance lower than the first luminance in response to the first input grayscale value.

12. The display device of claim 11, wherein, when the first pixel emits light and only one of the second pixels emits light, the first pixel emits light of a third luminance between the first luminance and the second luminance in response to the first input grayscale value.

13. The display device of claim 12, wherein, when the first pixel emits light and only two of the second pixels emit light, the first pixel emits light of a fourth luminance between the first luminance and the third luminance in response to the first input grayscale value.

14. The display device of claim 13, wherein, when the first pixel emits light and only three of the second pixels emit light, the first pixel emits light of a fifth luminance between the first luminance and the fourth luminance in response to the first input grayscale value.

15. The display device of claim 14, wherein the first pixel emits light of a first color, and wherein the second pixels emit light of a second color different from the first color.

16. The display device of claim 15, wherein the first color is blue.

17. The display device of claim 16, wherein the second color is green.

18. The display device of claim 11, wherein the first pixel is connected to a first data line different from second and third data lines to which the second pixels are connected.

19. The display device of claim 18, wherein the first pixel is connected to a first scan line different from second and third scan lines to which the second pixels are connected.

20. The display device of claim 19, wherein the first data line is located between the second and third data lines, and wherein the first scan line is located between the second and third scan lines.

* * * * *